US007861247B1

(12) United States Patent  
Santos et al.

(10) Patent No.: US 7,861,247 B1  
(45) Date of Patent: Dec. 28, 2010

(54) ASSIGNING RESOURCES TO AN APPLICATION COMPONENT BY TAKING INTO ACCOUNT AN OBJECTIVE FUNCTION WITH HARD AND SOFT CONSTRAINTS

(75) Inventors: Cipriano A. Santos, Palo Alto, CA (US); Akhil Sahai, Palo Alto, CA (US); Sharad Singhal, Palo Alto, CA (US); Dirk Beyer, Palo Alto, CA (US); Xiaoyun Zhu, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1733 days.

(21) Appl. No.: 11/048,530

(22) Filed: Jan. 31, 2005

Related U.S. Application Data

(63) Continuation-in-part of application No. 10/808,073, filed on Mar. 24, 2004.

(51) Int. Cl.  
    *G06F 9/46*     (2006.01)  
    *G06F 15/173*     (2006.01)  
    *G06F 19/00*     (2006.01)  
    *G05B 13/02*     (2006.01)

(52) U.S. Cl. .................. 718/104; 709/226; 700/28; 700/99

(58) Field of Classification Search .............. 718/104; 709/226; 700/28, 99  
See application file for complete search history.

(56) References Cited

U.S. PATENT DOCUMENTS

| | | | |
|---|---|---|---|
| 6,031,984 A * | 2/2000 | Walser | 703/2 |
| 6,304,892 B1 | 10/2001 | Bhoj et al. | |
| 6,662,167 B1 | 12/2003 | Xiao | |
| 6,742,016 B1 | 5/2004 | Bhoj et al. | |
| 7,660,649 B1 * | 2/2010 | Hope et al. | 700/295 |
| 2002/0143665 A1 | 10/2002 | Santos et al. | |
| 2002/0161622 A1 | 10/2002 | Zhang et al. | |
| 2002/0169648 A1 | 11/2002 | Zara et al. | |
| 2002/0169654 A1 | 11/2002 | Santos et al. | |
| 2002/0169655 A1 | 11/2002 | Beyer et al. | |
| 2002/0169696 A1 | 11/2002 | Zara et al. | |
| 2002/0174088 A1 | 11/2002 | Liu et al. | |
| 2002/0174182 A1 | 11/2002 | Wilkinson et al. | |
| 2002/0178052 A1 | 11/2002 | Beyer et al. | |
| 2002/0188579 A1 | 12/2002 | Liu et al. | |

(Continued)

OTHER PUBLICATIONS

U.S. Appl. No. 10/808,073, filed Mar. 24, 2004, Xiaoyun Zhu et al., Method and Apparatus for Allocating Resources to Applications.

(Continued)

*Primary Examiner*—Kenneth Tang

(57) ABSTRACT

Embodiments of the present invention relate to a system and method for assigning resources to an application component. One embodiment of the present invention includes identifying an application component, and determining available resources of a networked computing system for running the application component. Additionally, the embodiment includes determining required resources for the application component, assigning a subset of available resources for the application component taking into account the required resources of the application component, the available resources, and one or more operator policies. These operator policies generally include preferences of operators, administrators, users, or the like, and could also include business rules. Additionally, the embodiment includes associating the application component with the subset of available resources.

23 Claims, 5 Drawing Sheets

U.S. PATENT DOCUMENTS

| | | |
|---|---|---|
| 2003/0009545 A1 | 1/2003 | Sahai et al. |
| 2003/0018494 A1 | 1/2003 | Bronstein et al. |
| 2003/0033190 A1 | 2/2003 | Shan et al. |
| 2003/0046224 A1 | 3/2003 | Mujtaba et al. |
| 2003/0069960 A1 | 4/2003 | Symons et al. |
| 2003/0088428 A1 | 5/2003 | Singhal |
| 2003/0093527 A1* | 5/2003 | Rolia ................. 709/226 |
| 2003/0105881 A1 | 6/2003 | Symons et al. |
| 2003/0115090 A1 | 6/2003 | Mujtaba et al. |
| 2003/0120780 A1 | 6/2003 | Zhu et al. |
| 2003/0187773 A1 | 10/2003 | Santos et al. |
| 2004/0015957 A1 | 1/2004 | Zara et al. |
| 2004/0073673 A1 | 4/2004 | Santos et al. |
| 2004/0120330 A1 | 6/2004 | Rhine et al. |
| 2004/0120331 A1 | 6/2004 | Rhine et al. |
| 2004/0128384 A1 | 7/2004 | Rolia et al. |
| 2004/0153331 A1 | 8/2004 | Zhang et al. |
| 2004/0176992 A1 | 9/2004 | Santos et al. |
| 2004/0177138 A1 | 9/2004 | Salle et al. |
| 2004/0205187 A1 | 10/2004 | Sayal et al. |
| 2004/0236817 A1 | 11/2004 | Huberman et al. |
| 2005/0021530 A1* | 1/2005 | Garg et al. ................. 707/100 |
| 2005/0172291 A1* | 8/2005 | Das et al. ................. 718/104 |
| 2005/0228850 A1* | 10/2005 | Zhu et al. ................. 709/200 |

OTHER PUBLICATIONS

U.S. Appl. No. 10/856,222, filed May 28, 2004, Xiaoyun Zhu et al., Method for Assigning Network Resources to Applications for Optimizing Performance Goals.

U.S. Appl. No. 10/915,823, filed Aug. 11, 2004, Cipriano Santos et al., System and Method for Assigning an Application Component to a Computing Resource.

* cited by examiner

ASSIGNING RESOURCES TO AN APPLICATION COMPONENT BY TAKING INTO ACCOUNT AN OBJECTIVE FUNCTION WITH HARD AND SOFT CONSTRAINTS

CROSS-REFERENCE TO RELATED APPLICATION

This application is a continuation-in-part of U.S. patent application Ser. No. 10/808,073, filed Mar. 24, 2004 entitled "Method and Apparatus for Allocating Resources to Applications" by Zhu et al.

BACKGROUND

This section is intended to introduce the reader to various aspects of art, which may be related to various aspects of the present invention that are described or claimed below. This discussion is believed to be helpful in providing the reader with background information to facilitate a better understanding of the various aspects of the present invention. Accordingly, it should be understood that these statements are to be read in this light, and not as admissions of prior art.

Utility computing can be described as a process of accessing computing resources, capabilities, services, business processes, applications, or any combination thereof, from a utility-like service over a network. A company can use a common infrastructure to provide multiple clients with utility computing service, thus benefiting through economies of scale. Similarly, a client (e.g., a company receiving utility computing services) can use a utility computing service provider to avoid expenses associated with providing these services itself. Such costs could include hardware costs, software costs, and operation costs, in addition to maintenance and support costs. Through utility computing, such a client benefits financially by only paying for infrastructure and services actually used.

One example of a computing utility is grid computing, in which spare compute cycles of one entity can be provided for use by another entity. Another example is a data center, where a large pool of information technology (IT) resources are centrally managed to meet the needs of business critical enterprise applications such as enterprise resource planning applications, database applications, customer relationship management applications, and general e-commerce applications. It should be noted that computing utilities such as these (e.g., grid computing and data center) generally require infrastructure and management support.

A typical large utility computing environment contains thousands of servers and storage devices connected through a shared high-speed network fabric. Possible goals of assembling such an environment include providing compute, networking, and storage resources to applications as needed. Accordingly, resources can be virtualized and shared across multiple applications to achieve economies of scale and increase return on investment.

Simultaneously managing an infrastructure along with applications can be very complex. However, despite the fact that manual assignment is often inefficient, error-prone, and costly, existing data centers typically utilize human operators to manually allocate resources to applications. Accordingly, excessive operation costs and problems with human error can result. Further, for large scale data centers, manual assignment of resources can be extremely difficult.

DETAILED DESCRIPTION OF SPECIFIC EMBODIMENTS

One or more exemplary embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which could vary from one implementation to another. Moreover, it should be appreciated that such a development effort might be complex and time consuming, but would nevertheless be a routine undertaking of design, fabrication, and manufacture for those of ordinary skill having the benefit of this disclosure.

Embodiments of the present invention facilitate the automatic assignment of resources to applications in a utility computing environment based on the required resources of the applications, the available resources, and one or more operator policies. For example, embodiments of the present invention allow for automatic resource assignment instead of slow, expensive, and error-prone resource assignment by human operators.

Figure 1:
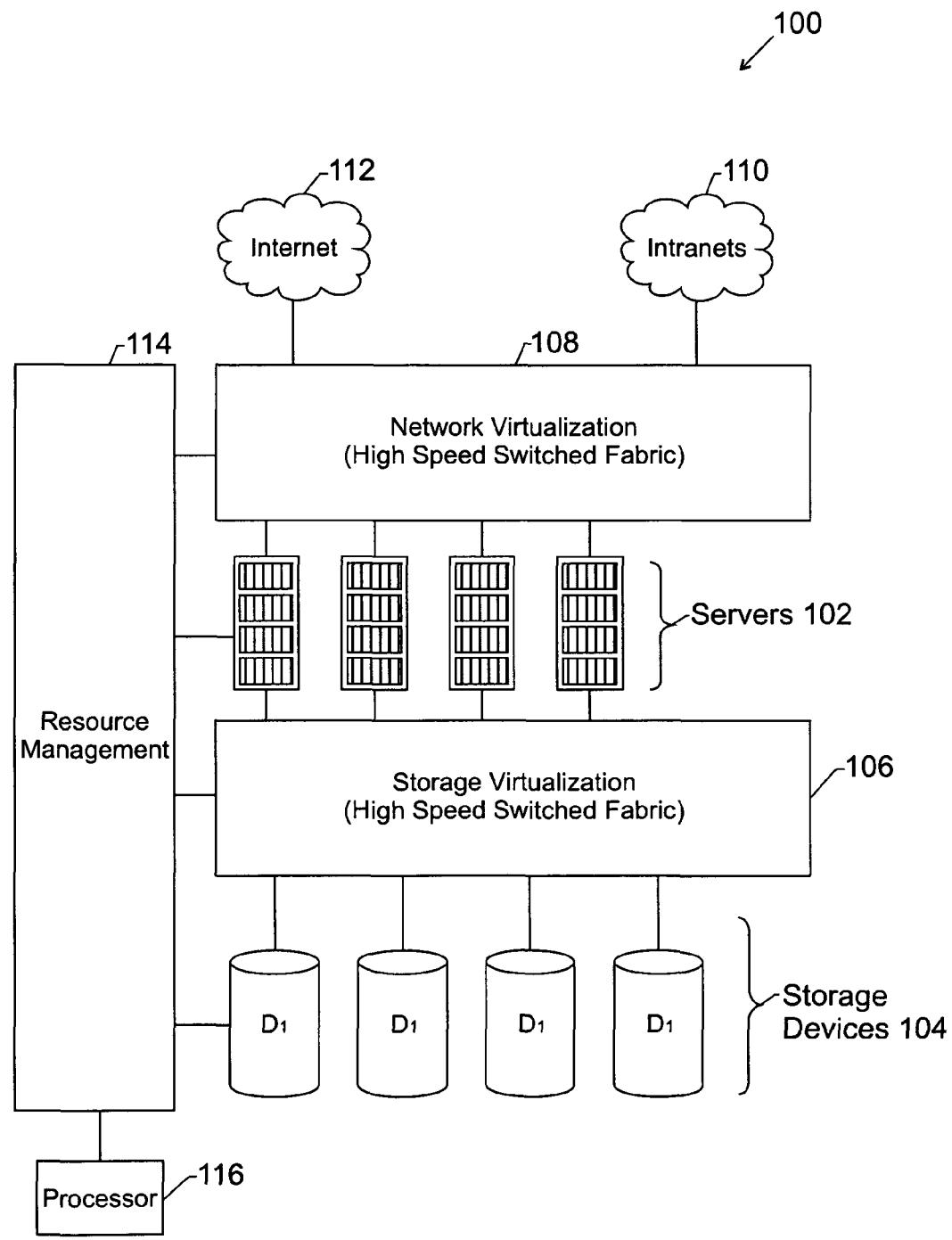
FIG. 1 is a block diagram depicting an exemplary utility computing infrastructure.

FIG. 1 is a diagram of an exemplary utility computing infrastructure illustrating one embodiment of the present invention. In general, the present disclosure relates to a resource assignment problem (RAP) for a large-scale computing utility, such as an Internet data center. Accordingly, FIG. 1 shows a computing utility infrastructure diagram 100 including servers 102 and storage devices 104 connected through a shared storage area network (SAN) 106. The storage devices can be "virtualized," in which case it would appear to the servers 102 and other network entities as though the storage devices 104 are locally connected and controlled. However, the storage devices 104 are capable of being remotely connected via the network fabric 106. Further, the physical components (e.g., disk arrays) of the storage devices 104 can be shared among many servers 102 at once.

In the present embodiment, the servers 102 are accessible via a network 108. The computing resources of the servers 102 can be virtualized over the high speed network fabric 108, such that the computing resources (e.g., processing, memory, storage) of each server 102 are capable of being simultaneously shared by numerous applications and users. Further, the applications can access the computing resources internally (e.g., via an intranet 110) or externally (e.g., via the Internet 112).

One goal of the utility computing infrastructure 100 could be to offer "infrastructure on demand," which means that compute, networking, and storage resources are provided to applications as they need them. Accordingly, most of the resources can be virtualized and shared across multiple applications to achieve economies of scale and increase return on investment.

A large-scale utility computing infrastructure 100 can contain thousands of servers 102 and storage devices 104. The complexity of managing such an infrastructure and applications simultaneously is enormous. Accordingly, automation can be helpful in lowering operation costs and reducing human error. Further, well-informed capacity planning and resource provisioning can increase asset utilization and assist in meeting service level objectives.

When an application is deployed in a computing utility infrastructure 100, it is generally allocated a partition of resources in a virtual application environment to meet the specific needs of the application. As each application's real time workload varies over time, resources can be dynamically re-allocated and re-distributed among all running applications to achieve high resource utilization. In many cases, the physical identities of the allocated resources are transparent to the application due to virtualization of resources.

It is generally the utility provider's job to choose the right set of physical resources for each application and its components to satisfy the application's configuration and performance requirements, to avoid resource bottlenecks in the infrastructure, and to achieve certain goals or enforce certain policies. This decision-making process is referred to herein as "resource assignment." Techniques for dealing with this process are an integral part of a resource access management framework that controls the complete lifecycle of applications' access to resources in a computing utility.

In existing data centers, resource assignment is typically done by human operators, making it slow, expensive, and error-prone. Further, as the size of future computing utilities grows to the magnitude of tens of thousands of resources, the number of possibilities to provision a given application could go far beyond the tracking ability of any person. This calls for a more systematic approach to resource assignment, wherein assignments are automated to significantly shorten application deployment cycles and minimize operator overhead.

In the example infrastructure 100, a resource management application 114 is used to automatically assign resources. The resource management application 114 is capable of handling initial resource assignments, as well as dynamically re-assigning resources in operation. Further, the resource management application 114 runs on one or more data processing arrangements, such as a processor 116. As would be appreciated by one skilled in the art, the processor 116 could be incorporated into a processor-based computer system.

In general, a relatively simple resource assignment scheme, such as random selection or first-come-first-served, could be inadequate because there are too many consequences to any particular solution that could be chosen. For instance, the compute requirements of the application could be such that they could not be met by some of the servers, the latency of the application can be poor, or the cost involved could be too high, and so forth. In particular, since networking resources are shared among different applications and their components, it is highly likely that a network link would become a bottleneck, thus degrading the performance of the applications that share this link. This assumes that network resources are not over-provisioned, and relatively high utilization on these resources are desired. Therefore, resource assignment is a highly complex problem that requires more intelligent solution techniques.

Generally, every application to be deployed in a computing utility has high-level requirements such as number of concurrent users, number of transactions per second and infrastructure cost. Usually, the mapping between these requirements and the specific identities of the resources that are used to host the application are not straightforward. This mapping can be broken down into two steps: determining resource requirements and mapping those requirements to available resources.

Figure 2:
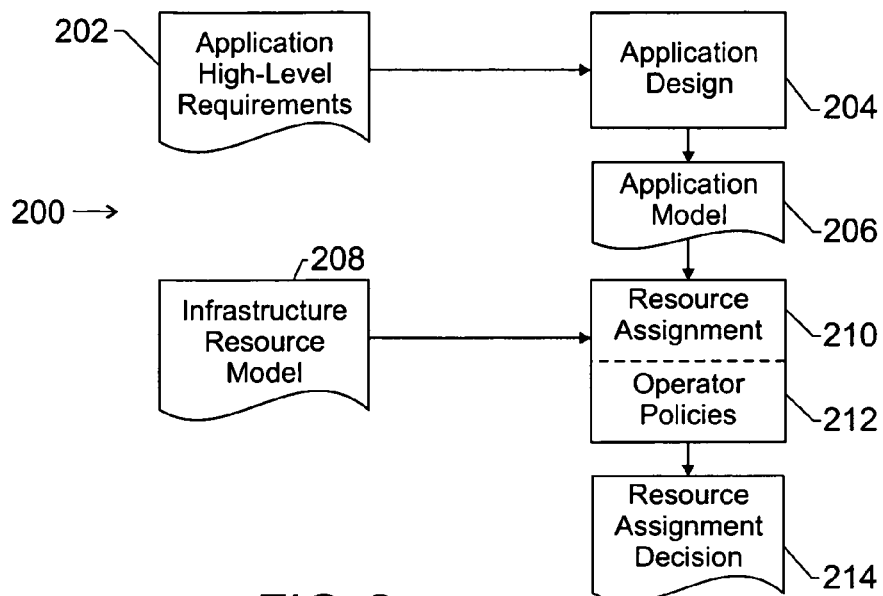
FIG. 2 is a block diagram illustrating an exemplary process for mapping requirements to resources.

FIG. 2 is a diagram illustrating a two-step process 200 for mapping requirements to resources in accordance with one embodiment of the present invention. The first block, application design 204, involves translating the application's high-level requirements 202 into an application model 206 representative of the low-level processing, communication and storage requirements on the physical resources. This translation generally requires domain knowledge and experience with the specific application, and typically involves benchmarking exercises.

The application model 206 is used together with an infrastructure resource model 208 as input to the next block, resource assignment 210. Resource assignment 210 involves deciding whether sufficient server and network resources exist in the infrastructure to accommodate the application's resource requirements, and if so, choosing the specific instances of resources from the infrastructure for use by the applications. Among other criteria, in this particular embodiment, this selection process also considers operator preferences or policies as indicated at reference number 212. Such policies can be represented as hard or soft constraints, as discussed in greater detail below. If, however, resource assignment 210 decides that no sufficient resources exist, or that assignment of resources to the application would excessively violate operator policies, then the application can be denied admission into the computing utility. The resource assignment block 210 requires knowledge of both the physical resources and application requirements contained in the application and resource models 206, 208. The resulting resource assignment decision (block 214) is then delivered to an application deployment engine, which configures the switches and servers and installs associated application components on the servers.

The concepts described herein are generally directed to solving the second block, resource assignment 210. In one embodiment of the present invention, the resource assignment problem (RAP) can be defined as follows: For a given topology of a network consisting of switches and servers with varying capabilities, and for a given application with a distributed architecture, decide which server from the physical network should be assigned to each application component, such that the traffic-weighted average inter-server distance is minimized, and the application's processing, communication and storage requirements are satisfied without exceeding network capacity limits.

Further, embodiments of the present invention can address a reformulation of the RAP with two extensions. Regarding the first extension, a generalized tree topology for the Ethernet fabric can be used. More specifically, instead of having edge switches (e.g., switches that connect other switches) and rack switches (e.g., switches that connect servers in a rack to another switch or set of servers), the LAN fabric can simply consist of a set of switches and a set of processing nodes connected in a tree topology. Regarding the second extension, a new model can be introduced that accommodates a scenario where multiple application components are assigned to the same server. This extension can transform the RAP from a pure assignment problem to a combination of assignment and bin-packing problem.

Further still, embodiments of the present invention allocate resources in view of preferences that could be desired by operators, administrators, users, or other external actors. While some policies could be derived from physical system limitations (e.g., bandwidth or storage capacity), operator preferences are also considered during resource assignment through use of hard and soft constraints. For instance, embodiments of the present invention employ hard or soft constraints to set priorities for various applications or to avoid the creation of resource bottlenecks.

Accordingly, embodiments of the present invention allow several issues to be addressed when resources are assigned to applications. In one example, an application's processing, communication, and storage requirements are met by the assigned resources. In another example, an application's performance goal (e.g., minimizing internal communication delay) is achieved. Additionally, embodiments allow multiple applications, multiple application components, or some combination thereof to co-exist on the same infrastructure without interfering with performance. Further, embodiments of the present invention enable many distributed applications (e.g., enterprises applications, Web applications, engineering jobs, etc.) to be deployed in utility computing environments (e.g., Hewlett Packard's Utility Data Centers (UDCs)) in an automated fashion such that the complexity of provisioning an application can be embedded in the management software. Further still, embodiments of the present invention also allow consideration of desired business, technical, and operator policies in assigning resources to applications. Accordingly, embodiments reduce data center operator overhead, shorten the time for application deployment, and lower the cost for resource management. In addition, embodiments reduce provisioning error and provide better scalability, while allowing for prioritization of applications or users.

Figure 3:
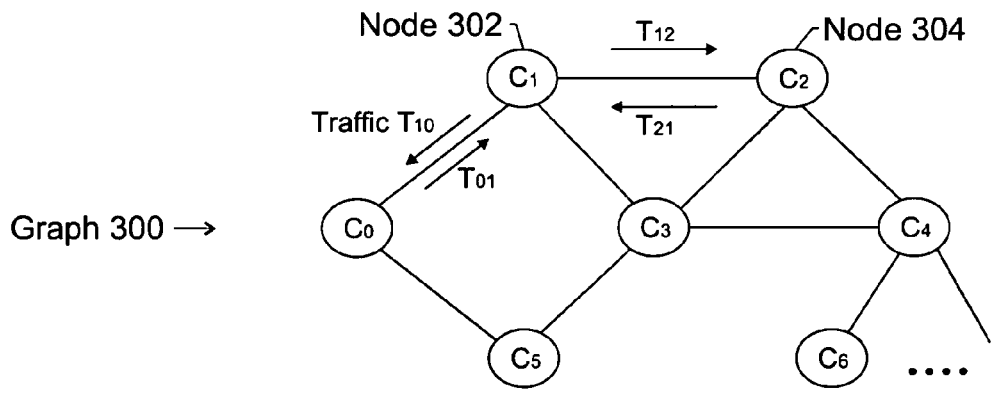
FIG. 3 is a graph illustrating an exemplary application model diagram.

FIG. 3 is a graph illustrating an application model diagram in accordance with an embodiment of the present invention. An application can be characterized by a set of components that communicate with one another in a certain way. The application can be represented by a bidirectional graph G(C, L) 300, where each node c∈C (e.g., 302, 304) represents an application component, and each directed edge l=(c,c')∈L (as represented by the lines connecting the components) represents an ordered pair of component nodes, representing communication from component c to component c'. The component $c_0$ is an artificial component representing the outside world to the application. For example, $c_0$ can correspond to the Internet being in communication with the application. The matrix T is defined to characterize the traffic pattern of the application and traffic between all component pairs. Each element $T_{cc'}$ represents the maximum amount of traffic going from component c to component c'. $T_{cc'}=0$ if an edge (c,c') does not exist, indicating no traffic flows from component c to component c'. Further, in the traffic matrix T, $T_{c0}$ represents the amount of traffic going out of component c to the Internet or to external clients, while $T_{0c}$ represents the amount of traffic coming into component c from the Internet or from external clients.

The mathematical model for the component-based architecture illustrated in FIG. 3 contains the sets and parameters in Table 1A below. It should be noted that ∈ generally denotes an "element of," ∪ generally denotes a "union," and dim generally represents "dimension."

TABLE 1A

Sets and indices

| | |
|---|---|
| c ∈ C: | Set of application components. |
| l ∈ L: | Set of directed links in the application architecture graph. Each link l = (c, c') is an ordered pair of two components c and c' in C. |

TABLE 1A-continued

Sets and indices

| | |
|---|---|
| c' ∈ $N_c$: | Set of components that communicate with component c, i.e., $N_c$ = {c' ∈ C:(c, c' ) ∈ L}. |
| Parameters: | |
| T: | \|C\| × \|C\|-dim matrix. $T_{cc'}$ is the amount of communication traffic from component c to component c'. |
| $TO_c = \sum_{c' \in N_c} T_{cc'}$: | Total amount of LAN traffic going out of component c. |
| $TI_c = \sum_{c' \in N_c} T_{c'c}$: | Total amount of LAN traffic coming into component c. |
| $VREQ_{ac}$: | Required value set of non-capacitated attribute (e.g., a characteristic that is not numerically quantifiable) a ∈ $A^{noncap}$ by component c. |
| $CREQ_{ac}$: | Required capacity of capacitated attribute (e.g., a characteristic that is numerically quantifiable) a ∈ $A^{lin} \cup A^{nonlin}$ by component c. |

Each application component has requirements on the type of servers on which it can be hosted. For each non-capacitated server attribute (e.g., processor type, operating system type), each application component has a set of allowable values (e.g., {PA-RISC 2.0, ULTRA SPARC}). For each capacitated server attribute (e.g., disk space, processing speed), each application component has a minimum required capacity (e.g., 2 CPUs, 1.5 GB RAM). These requirements can be compared to each server's attribute values for making assignment decisions. Let P be the set of server attributes (or properties) that are of interest to a particular application, such as processor type, processor speed, number of processors, memory size, disk space, and so on. Then for each attribute p∈P and each application component c∈C, the requirement can be characterized by a set $VREQ_{cp}$, which contains the permissible values of attribute p for component c. This set could be either discrete or continuous. For example, an application component could require a server's processor architecture to be in {SPARC, PA_RISC}, and its processor speed to be in an interval [500, 1000] (in MHz).

Embodiments of the present invention are capable of dealing with a plurality of component types. An application component is generally classified into one of two categories in terms of server sharing. A first category is herein referred to as Type I and a second category is referred to as Type II. A Type I category component requires a dedicated server. In contrast, a Type II category component is capable of sharing a server with other components. Specifically, embodiments of the present invention can deal with both Type I and Type II components by allowing a single server to be assigned to multiple Type II components at the same time. Let $C^1$ denote the subset of components that are Type I, and $C^m$ be the subset of components that are Type II. Then $C = C^1 \cup C^m$ and $C^1 \cap C^m = \emptyset$.

Embodiments of the present invention are capable of deciding or facilitating deciding which server in a tree network should be assigned to each application component or subset of Type II components. For example, embodiments of the present invention can make decisions such that the average network distance between all components is minimized, where distance is measured in terms of network hops. Similarly, embodiments of the present invention can insure that attribute requirements for all the application components are satisfied and that communication traffic between servers does not exceed link capacities in the LAN. Additionally, as discussed below, embodiments of the present invention also consider operator preferences, such as the priority of the application or user, in assigning resources.

Figure 4:
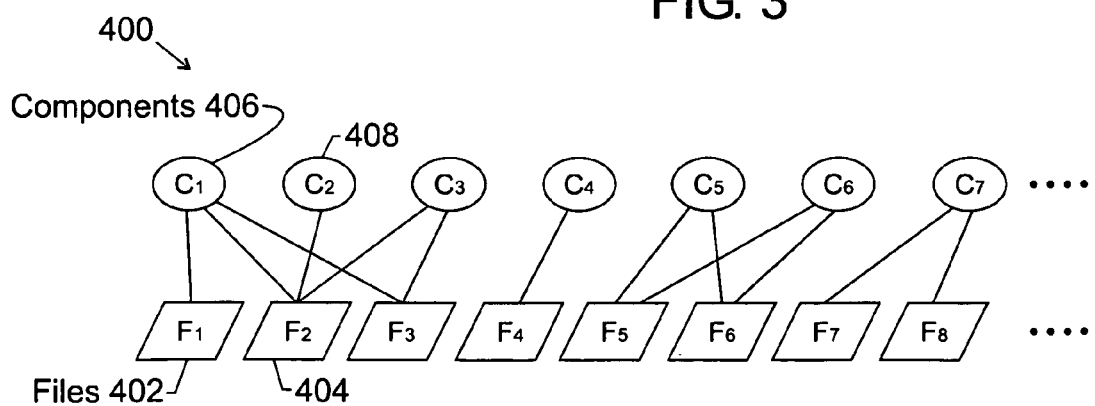
FIG. 4 is a graph illustrating an exemplary model for storage requirements.

FIG. 4 is a graph illustrating a model for storage requirements in accordance with at least one embodiment of the present invention. The storage access pattern of applications can be represented by a bipartite graph 400. It is assumed that data for an application can be divided into a set of "files" or data chunks (e.g., 402, 404). Here a file or data chunk represents any logically contiguous chunk of data that can be accessed by application components (e.g., 406, 408). The example illustrates that the mapping between an application component and a file need not be one-to-one. More specifically, each component could access multiple files, and each file could be accessed by more than one component. With this in mind, the application model contains the following sets and parameters that capture the application's storage requirements, in addition to those defined in Table 1A.

TABLE 1B

| Sets and Indices: | |
| --- | --- |
| $f \in F$: | Set of files to be placed on storage devices. |
| Parameters: | |
| TCF: | $|C| \times |F|$-dim matrix. $TCF_{cf}$ is the amount of write traffic from component c to file f. |
| TFC: | $|F| \times |C|$-dim matrix. $TFC_{fc}$ is the amount of read traffic from file f to component c. |

As would be understood by one skilled in the art, the application models illustrated in FIGS. 3 and 4 can also be used for simultaneous assignment of resources to multiple applications. For instance, a single large graph could be constructed with all the components from all the applications, where each application is represented by a sub-graph similar to that depicted in FIG. 3. Likewise, a single composite graph could also be constructed with components and files from multiple applications, wherein each application is represented in a manner similar to that of FIG. 4.

The following paragraphs describe the mathematical models for the processing, networking, and storage resources in a computing utility. The collection of resources as a whole is referred to as the "utility fabric," which includes servers that can be assigned to applications, the local area networking (LAN) fabric (e.g., Ethernet) that connects the servers to each other, and the storage area network (SAN) fabric that connects the servers to the centralized storage devices.

Let S be the set of servers in the physical network. The notion of a "server" here is not restricted to a compute server. The server could be a firewall, a load balancer, a network attached storage (NAS) device, a VPN (virtual private network) gateway, or any other device an application might need as a component. A server attribute "server type" is used to distinguish between different kinds of servers. Because of the inherent heterogeneity of resources in a large computing utility, even the same type of servers could have different processor architecture and processing power. Therefore, more attributes are used to describe a server. The value for each of these attributes is either fixed or configurable. For example, a server can have fixed attributes such as an "1A32" architecture or a CPU speed of 550 MHZ, while its memory size is configurable between 4 and 8 MB. For each server s∈S, the set $V_{sp}$ is used to represent its possible values for attribute p∈P.

Before describing the mathematical models for the networking fabric, a common set of networking assumptions are made to simplify the models. First, all the network links are assumed to be duplex links and traffic can flow in either direction. In addition, link capacities for the two directions can be different. Secondly, for any physical link in any direction, its "link capacity" can be the minimum of the bandwidth capacities of the link, the source port, and the destination port.

Further, multiple physical links between two devices that are all active and load balanced are capable of being combined into one logical link with aggregated capacity. For example, four 1 Gbit/sec physical links can be combined to form one 4 Gbit/sec link in the logical topology. This simplification is valid when the combined links have equal bandwidth and share approximately equal load. This could also be the case if trunking technology is applied on the links.

Additionally, if two switches appear in a redundant pair to avoid single point of failure, then redundant paths exist between at least one pair of devices in the physical topology. This can be simplified in different ways depending on the network protocol the switches implement. For example, in the LAN fabric, the spanning tree protocol can be enforced, resulting in all the redundant paths between two network devices being blocked except one. If two switches in a redundant pair are both active and being load balanced, then the switches or servers that are connected to these two switches can be partitioned into two sets, one under each switch. Further, the cross links can be blocked. Alternatively, the SAN fabric can implement the Fabric Shortest Path First (FSPF) protocol, which assures uniform traffic load sharing over equivalent paths. Moreover, the two links in the same segment of the two paths usually have the same bandwidth. As a consequence, a pair of redundant switches can be merged into one switch. Corresponding links can also be merged to form a bigger link with aggregated bandwidth.

These simplifying assumptions can be applied to both the LAN and the SAN fabrics as they are represented using mathematical models. It can also be assumed that the logical topology of the LAN fabric in the computing utility can comprise a tree. This assumption is based in part on the fact that a layer-two switched network can implement the spanning tree protocol, which guarantees that there is a unique active path between two network devices.

Figure 5:
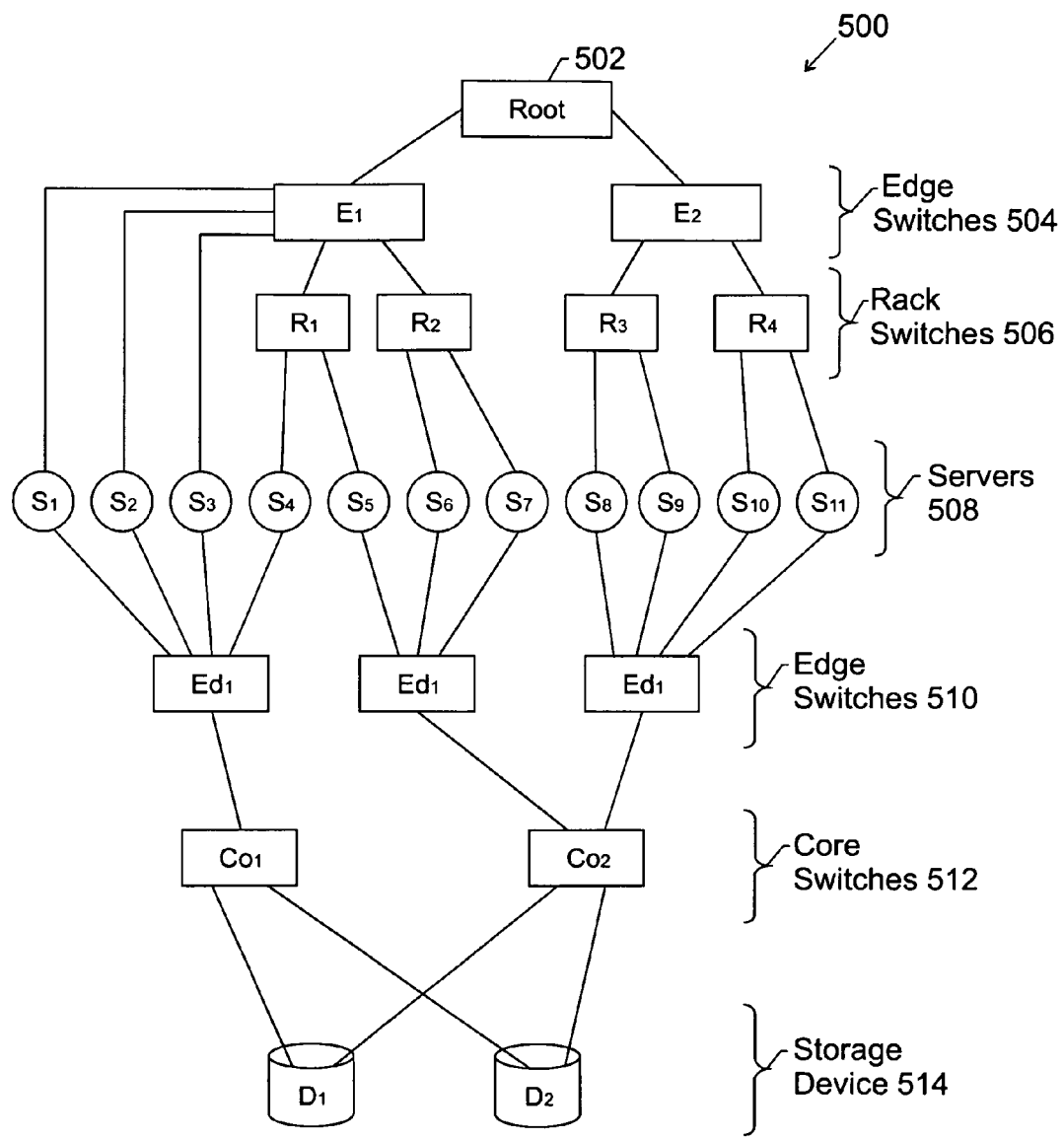
FIG. 5 is a block diagram illustrating an exemplary LAN fabric topology.

FIG. 5 is a diagram illustrating an exemplary LAN fabric topology 500 in accordance with the present techniques. Beginning with the upper portion of the diagram, a switching or routing device 502 that connects the utility fabric to the Internet or other utility fabrics is provided. This device 502 is referred to as a root switch. Below the root switch 502 is a set of edge switches 504, and below the edge switches 504 is a set of rack switches 506. Servers 508 are illustrated directly connected to either an edge switch 504 or a rack switch 506. It should be noted, however, that as discussed below with respect to FIG. 6, servers 508 are also capable of being connected to root switch 502. As the present figure shows, an edge switch 504 can be connected to a set of rack switches 506, a set of servers 508, or a combination of both.

The three-layer network shown in FIG. 5 is chosen for demonstration purposes. It will be appreciated that the models described herein can be adapted for any LAN fabric topology that can be represented as a tree. Therefore the methodology described herein is applicable to a tree network that has a fewer or greater number of layers.

The mathematical model for the LAN contains the following sets and parameters shown below in Table 2.

TABLE 2

Sets and Indices

| | |
|---|---|
| $s \in S$: | Set of servers. |
| $r \in R$: | Set of rack switches in the LAN. |
| $e \in E$: | Set of edge switches in the LAN. |
| $R_e \subset R$: | Set of rack switches connected to edge switch e in the LAN. |
| $SR_r \subset S$: | Set of servers connected to LAN rack switch r. |
| $SE_e \subset S$: | Set of servers connected (directly or indirectly) under LAN edge switch e. |
| $p \in P$: | Set of server attributes required by the application. |
| | Parameters: |
| $BSI_s$: | The incoming bandwidth of server s. |
| $BSO_s$: | The outgoing bandwidth of server s. |
| $BRI_r$: | The incoming bandwidth of rack switch r. |
| $BRO_r$: | The outgoing bandwidth of rack switch r. |
| $BEI_e$: | The incoming bandwidth of edge switch e. |
| $BEO_e$: | The outgoing bandwidth of edge switch e. |
| $V_{sp}$: | Set of possible values for attribute p of server s. |

For easy indexing, in one embodiment, each logical link in the network is associated with a device with which it is uniquely identified. For example, the link that connects server s to a rack or edge switch is associated with that server and its downstream/upstream bandwidth is referred to as the incoming/outgoing bandwidth of server s. The same rule is applicable to the links at the upper layers.

Various SAN topologies have been used in practice. The popular ones include ring, cascade, mesh, and core/edge topologies. Among these, the core/edge topology provides resiliency, scalability, flexibility and throughput, and is adopted by many vendors and SAN designers. Therefore, it can be assumed that the SAN fabric in a computing utility has a core/edge topology. The lower portion of FIG. 5 exemplifies a SAN with this topology. However, it should be noted that embodiments other than the core/edge topology can be employed.

The core/edge topology contains two layers of switches. The core layer consists of at least one pair of redundant core switches 512 that are typically the most powerful. All the other switches connected to the core switches 512 are referred to as edge switches 510. The centralized storage devices 514, such as disk arrays, are attached directly to the core switches 512, and the servers 508 are attached directly to the edge switches 510. Such a topology ensures that every storage device 514 is accessible by any server 508 in the SAN. As may be appreciated by one skilled in the art, this logical topology is a simplification from the physical topology with redundancies in network devices and links.

The mathematical model for the SAN contains sets and parameters shown below in Table 3.

TABLE 3

Sets and indices:

| | |
|---|---|
| $s \in S$: | Set of servers. |
| $d \in D$: | Set of storage devices. |
| $k \in K$: | Set of FC core switches in the SAN. |
| $g \in G$: | Set of FC edge switches in the SAN. |
| $SED_g \subset S$: | Set of servers connected to FC edge switch g. |
| $SCO_k \subset S$: | Set of servers (indirectly) connected to FC core switch k. |
| | Parameters: |
| BDC: | $|D| \times |K|$-dim matrix. $BDC_{dk}$ is the bandwidth of the FC link going from storage device d to core switch k. |
| BCD: | $|K| \times |D|$-dim matrix. $BCD_{kd}$ is the bandwidth of the FC link going from core switch k to storage device d. |
| BCE: | $|G|$-dim vector. $BCE_g$ is the bandwidth of the FC link going from a core switch k to edge switch g. |

TABLE 3-continued

| | |
|---|---|
| BEC: | $|G|$-dim vector. $BEC_g$ is the bandwidth of the FC link going from edge switch g to a core switch k. |
| BES: | $|S|$-dim vector. $BES_s$ is the bandwidth of the FC link going from an edge switch g to server s. |
| BSE: | $|S|$-dim vector. $BSE_s$ is the bandwidth of the FC link going from server s to an edge switch g. |

The resource assignment problem concerns selecting the right server in the utility fabric for each application component, represented by the following matrix of binary variables: For all $c \in C$ and $s \in S$, $$x_{cs} = \begin{cases} 1 & \text{server } s \text{ assigned to component } c; \\ 0 & \text{otherwise.} \end{cases}$$

In addition, the following two matrices of binary variables are defined. For all $c \in C$, $r \in R$, and $e \in E$, $$zr_{cr} = \begin{cases} 1 & \text{rack switch } r \text{ assigned to component } c; \\ 0 & \text{otherwise.} \end{cases}$$

$$ze_{ce} = \begin{cases} 1 & \text{edge switch } e \text{ assigned to component } c; \\ 0 & \text{otherwise.} \end{cases}$$

In this formulation, a switch is assigned to a component if at least one server connected (directly or indirectly) under the switch is assigned to that component. Note that these two variables are redundant to the variables $x_{cs}$. They are introduced to help express the network constraints, such as Ethernet bandwidth constraints, in a more succinct way, and to make solving of the problem more efficient.

Resources in a computing utility can be assigned to application components based on many criteria, such as application performance, resource utilization, operator policies, or economic concerns. These can be associated with different objective functions of the optimization problem. As formulated herein, the objective function could be chosen to minimize the traffic-weighted average inter-server distance, where distance is measured in terms of network hop count. Let $DIST_{ss'}$ be the distance between two servers s and s', and $TSS_{ss'}$ be the amount of LAN traffic from server s to server s' as a result of server assignment. Then the objective function can be represented as:

$$\text{Min } J1 = \sum_{s,s' \in S} DIST_{ss'} * TSS_{ss'}$$

As is apparent, $$TSS_{ss'} = \sum_{c \in C} \sum_{c' \in N_c} x_{cs} T_{cc'} x_{c's'}.$$

The value of $DIST_{ss'}$ depends on the relative location of server s and s'. For example, $DIST_{ss'}=2$ if both servers are directly connected to the same switch, which is generally a preferred situation if these two servers communicate heavily.

By dividing the set of all server pairs into a number of subsets, each with a different $DIST_{ss'}$ value, calculating the summation on each subset and adding them results in:

$$J1 = 2\sum_{c \in C}(TO_c + TI_c) + \sum_{r \in R}\sum_{c \in C}zr_{cr}(TO_c + TI_c) - 2\sum_{r \in R}\sum_{c \in C}\sum_{c'=N_c}zr_{cr}T_{cc'}zr_{c'r} - \sum_{r \in R}\sum_{c \in C}\sum_{c'=N_c}2ze_{ce}T_{cc'}ze_{c'e}$$

The first term represents the total amount of traffic originated from and received by all the components, which is a constant. Therefore, an equivalent objective function follows:

$$\text{Min } J2 = \sum_{r \in R}\sum_{c \in C}zr_{cr}(TO_c + TI_c) - 2\sum_{r \in R}\sum_{c \in C}\sum_{c' \in N_c}zr_{cr}T_{cc'}zr_{c'r} - \sum_{e \in R}\sum_{c \in C}\sum_{c' \in N_c}2ze_{ce}T_{cc'}ze_{c'e}$$

This is a quadratic function of the binary variables $zr_{cr}$ and $ze_{ce}$. The first term represents the total amount of traffic originated and received under all the rack switches. A similar term for all the edge switches, $$\sum_{e \in E}\sum_{c \in C}ze_{ce}(TO_c + TI_c),$$

would have been present, but was removed as part of the constant term. The second and third terms together capture the total amount of intra-switch traffic at all the switches. Here "intra-switch traffic" is defined as the traffic flows whose source and destination nodes are servers under the same switch. As components that communicate heavily are placed close to each other in the network of one embodiment, the amount of intra-switch traffic is increased, which in turn results in a smaller value for the objective function. In general, this leads to lower communication delay between application components inside the LAN fabric.

In the present embodiment, SAN latency is excluded from the objective function for the following two reasons. First, the SAN topology in this problem has the property that the number of hops for each data flow is fixed at three because any server and storage device pair is connected through two FC switches. This means, any server assignment solution results in the same SAN latency measure. Second, storage systems latency could be dominated by I/O access at the storage device, which could be several orders of magnitude larger than the SAN latency. Therefore, even if the number of hops could be reduced between a server and a storage device, it is generally inconsequential with respect to storage access latency. On the other hand, link capacity in the SAN is sometimes a concern in storage systems performance. Given the high cost of SAN switches, grossly over-provisioning is not usually preferred, while at the same time it is typically not be desirable to allow the SAN fabric to be easily saturated. With this observation, the SAN link capacity in the RAP is capable of being handled without adding any new objective function. The rest of this section describes constraints in the problem that limit the search space for optimal server assignment solutions.

Before describing constraints in the RAP, a server feasibility matrix FS is defined, where:

$$FS_{cs} = \begin{cases} 1 & \text{if switch } s \text{ meets the processing, networking, and I/O} \\ & \text{requirements of component } c; \\ 0 & \text{otherwise.} \end{cases}$$

More specifically, $FS_{cs}=1$ if and only if:

$$V_{sp} \cap VREQ_{cp} \neq \phi, \forall p \in P \quad (1)$$

$$\sum_{c' \in N_c}T_{c'c} \leq BSI_s \text{ and } \sum_{c' \in N_c}T_{cc'} \leq BSO_s \quad (2)$$

$$\sum_{f \in F}TCF_{cf} \leq BSE_s \text{ and } \sum_{f \in F}TFC_{cf} \leq BES_s \quad (3)$$

Condition (1) ensures that server s matches the server attribute requirement by component c. Condition (2) ensures that the aggregate LAN traffic at each component c does not exceed the link bandwidth of server s in either direction. Further, condition (3) guarantees that the total amount of SAN traffic at each component c does not exceed the I/O bandwidth of server s in either direction.

The server feasibility matrix can be pre-computed before the optimization problem can be solved. When the matrix FS is sparse, the search space for the optimization problem is significantly reduced.

Similarly, feasibility matrices FR and FE can be defined for rack and edge switches, respectively, where $FR_{cr}=1$ if there is at least one feasible server under rack switch r for component c, $FE_{ce}=1$ if there is at least one feasible server under edge switch e for component c. These two matrices can also be pre-computed.

The constraints on the decision variables, which one skilled in the art would easily recognize as hard constraints, can be as follows.

Normality constraints: A unique server is assigned to each application component:

$$\sum_{s \in S}x_{cs} = 1, \forall c \in C \quad (4)$$

Each server is assigned to at most one component:

$$\sum_{c \in C}x_{cs} \leq 1, \forall s \in S \quad (5)$$

Variable relationship constraints: A rack switch is assigned to a component if and only if a server under this rack switch is assigned to this component:

$$\sum_{s \in SR_r}x_{cs} = zr_{cr}, \forall c \in C, r \in R \quad (6)$$

An edge switch is assigned to a component if and only if a server under this edge switch is assigned to this component:

$$\sum_{s \in SE_e} x_{cs} = ze_{ce}, \quad \forall c \in C, \quad e \in E \tag{7}$$

LAN fabric constraints: The LAN traffic going out of each rack switch to an edge switch cannot exceed the link capacity:

$$\sum_{c \in C} TO_c zr_{cr} - \sum_{c \in C} \sum_{c' \in N_c} zr_{cr} T_{cc'} zr_{c'r} \leq BRO_r, \quad \forall r \in R \tag{8}$$

$TO_c$ is the total amount of LAN traffic originating from component c. On the left hand side, the first item represents the total amount of traffic originating under rack switch r, and the second item represents the amount of intra-switch traffic at this switch. Hence, the left hand side represents the amount of traffic passing through switch r, which should be bounded by the outgoing link bandwidth at the switch.

The derivation of the following three constraints is similar and, therefore, will be omitted. The LAN traffic coming into each rack switch from an edge switch does not exceed the link capacity:

$$\sum_{c \in C} TI_c zr_{cr} - \sum_{c \in C} \sum_{c' \in N_c} zr_{cr} T_{cc'} zr_{c'r} \leq BRO_r, \quad \forall r \in R \tag{9}$$

Remember that $TI_c$ represents the total amount of LAN traffic received by component c.

The LAN traffic going out of each edge switch to the root switch cannot exceed the link capacity:

$$\sum_{c \in C} TO_c ze_{ce} - \sum_{c \in C} \sum_{c' \in N_c} ze_{ce} T_{cc'} ze_{c'e} \leq BEO_e, \quad \forall e \in E \tag{10}$$

The LAN traffic coming into each edge switch from the root switch cannot exceed the link capacity:

$$\sum_{c \in C} TI_c ze_{ce} - \sum_{c \in C} \sum_{c' \in N_c} ze_{ce} T_{cc'} ze_{c'e} \leq BEI_e, \quad \forall e \in E \tag{11}$$

SAN fabric constraints: The SAN traffic going out of each FC edge switch to a core switch cannot exceed the link capacity:

$$\sum_{s \in SED_g} \sum_{f \in F} \sum_{c \in C} TCF_{cf} x_{cs} \leq BEC_g, \quad \forall g \in G \tag{12}$$

The SAN traffic coming into each FC edge switch from a core switch cannot exceed the link capacity:

$$\sum_{s \in SED_g} \sum_{f \in F} \sum_{c \in C} TFC_{fc} x_{cs} \leq BCE_g, \quad \forall g \in G \tag{13}$$

The SAN traffic from an FC core switch to a storage device cannot exceed the link capacity:

$$\sum_{s \in SCO_k} \sum_{f \in F} \sum_{c \in C} TCF_{cf} x_{cs} Y_{fd} \leq BCD_{kd}, \quad \forall k \in K, d \in D \tag{14}$$

Here $Y_{fd}$ is a binary parameter, where $Y_{fd}=1$ if and only if file f is placed on storage device d. As discussed above, the file placement problem can be separated from the server assignment problem. The former has $Y_{fd}$ as its decision variable. The solution can be fed into the RAP problem as an input.

The SAN traffic from a storage device to an FC core switch cannot exceed the link capacity:

$$\sum_{s \in SCO_k} \sum_{f \in F} \sum_{c \in C} TFC_{fc} x_{cs} \leq BDC_{dk}, \quad \forall k \in K, d \in D \tag{15}$$

Feasibility constraints: All the variables are binary, and all the assigned servers, rack switches, and edge switches are feasible:

$$x_{cs} \in \{0, FS_{cs}\}, zr_{cr} \in \{0, FR_{cr}\}, ze_{ce} \in \{0, FE_{ce}\} \tag{16}$$

In summary, the complete formulation of the optimization problem for RAP is:

$$\text{Min } J2 = \sum_{r \in R} \sum_{c \in C} zr_{cr}(TO_c + TI_c) - $$

$$2 \sum_{r \in R} \sum_{c \in C} \sum_{c' \in N_c} zr_{cr} T_{cc'} zr_{c'r} - \sum_{e \in E} \sum_{c \in C} \sum_{c' \in N_c} 2 ze_{ce} T_{cc'} ze_{c'e}$$

and subject to constraints (4)-(16) above. This is a nonlinear combinatorial optimization problem, which is NP-hard (Non-deterministic Polynomial-time hard), which refers to the class of decision problems (a problem where all the answers are YES or NO) that contains all problems H such that for all decision problems L in non-deterministic polynomial-time (NP) there is a polynomial-time many-one reduction to H. This problem is referred to as the original formulation of RAP and labeled as RAP0. The problem formulation described above can be applied to a number of different use cases, some of which are shown in Table 4. It should be noted that NP can refer to a set of decision problems that is solvable in polynomial time on a non-deterministic Turing machine (an abstract model of computer execution and storage). Alternatively, NP could refer to a set of decision problems that can be reformulated as a binary function A(x, y) over strings such that, for a certain constant number c, a string x is an element of the original decision problem if there is a string y with length smaller than |x|c such that the function A can be decidable in polynomial time by a Turing machine. It may further be noted that a polynomial-time many-one reduction (also known as polynomial transformation or Karp reduction) is capable of reducing one decision problem to another one in such a way that any algorithm solving the latter immediately yields an algorithm solving the former, with only a modest slow-down.

TABLE 4

| Use Case | Description |
| --- | --- |
| Green-field assignment | This occurs when the first application is initially deployed in an empty utility. |
| Subsequent assignment | This occurs when there are existing applications running in the utility, and resources are assigned to the next application. In this case, the same application and resource models can be used, except that parameters in the resource model should reflect the remaining resource capacity. |
| Multiple applications assignment | This occurs when resources need to be assigned to more than one application at the same time. A larger application model with components from multiple applications can be used for this purpose. |
| Dynamic assignment | This occurs when an existing application requests more resources as its real time workload intensity changes. In this case, a new application model will be submitted containing the additional requirement. Depending on the application's ability to accommodate server migration, the problem can be resolved with or without fixing the existing server assignment. |
| Automatic fail over | This occurs when a server without high-availability configuration fails and needs replacement. The best server to use from the pool of available servers can be found using a similar RAP formulation. |

The first three use cases can happen at application deployment time, while the last two use cases can be useful at run time. Therefore, the former is at a time scale of days or longer, while the latter is at a shorter time scale of minutes or hours.

The number of binary variables in RAP0 is $|C| \times (|S|+|R|+|E|)$, which is generally dominated by $|C| \times |S|$, the number of application components times the number of servers in the utility. It is conceivable that the problem becomes computationally more challenging as the infrastructure size or application size grows. Any heuristic search algorithms are not guaranteed to find a feasible and optimal solution. The next section presents two linearized formulations as mixed integer programming problems, which can be solved directly using a commercial solver, such as CPLEX.

As previously described, the original formulation RAP0 is nonlinear because the objective function and the LAN fabric constraints (8)-(11) are quadratic in binary variables $zr_{cr}$ and $ze_{ce}$. This type of nonlinearity can be removed using a standard substitution technique with the observation that the product of binary variables is also binary. First, the following set of binary variables are defined: $yr_{cc'r} = zr_{cr} zr_{c'r}$ and $ye_{cc'e} = ze_{ce} ze_{c'e}$, for all $c, c' \in C$, $r \in R$, $e \in E$.

With these new variables, the objective function can be rewritten as:

$$\text{Min } J2 = \sum_{r \in R} \sum_{c \in C} zr_{cr}(TO_c + TI_c) -$$

$$2 \sum_{r \in R} \sum_{c \in C} \sum_{c' \in N_c} T_{cc'} yr_{cc'r} - 2 \sum_{e \in E} \sum_{c \in C} \sum_{c' \in N_c} T_{cc'} ye_{cc'e}$$

This is a linear combination of all the $zr_{cr}$, $yr_{cc'r}$ and $ye_{cc'e}$ variables. Similarly, constraints (8) through (11) in RAP0 can be rewritten as linear constraints as follows:

$$\sum_{c \in C} TO_c zr_{cr} - \sum_{c \in C} \sum_{c' \in N_c} T_{cc'} yr_{cc'r} \leq BRO_r, \quad \forall r \in R \quad (17)$$

$$\sum_{c \in C} TI_c zr_{cr} - \sum_{c \in C} \sum_{c' \in N_c} T_{cc'} yr_{cc'r} \leq BRI_r, \quad \forall r \in R \quad (18)$$

$$\sum_{c \in C} TO_c ze_{ce} - \sum_{c \in C} \sum_{c' \in N_c} T_{cc'} ye_{cc'e} \leq BEO_e, \quad \forall e \in E \quad (19)$$

$$\sum_{c \in C} TI_c ze_{ce} - \sum_{c \in C} \sum_{c' \in N_c} T_{cc'} ye_{cc'e} \leq BEI_e, \quad \forall e \in E. \quad (20)$$

Additional constraints are used to ensure that the $yr_{cc'r}$ variables behave as the product of binary variables. First, to ensure that $zr_{cr}=0$ or $zr_{c'r}=0 \Rightarrow yr_{cc'r}=0$, the following can be used:

$$zr_{cr} \geq yr_{cc'r}, zr_{c'r} \geq yr_{cc'r} \quad \forall c,c' \in C, r \in R \quad (21)$$

Second, to ensure $zr_{cr}=1$ and $zr_{c'r}=1 \Rightarrow yr_{cc'r}=1$, the following constraint could be used:

$$zr_{cr} + zr_{c'r} - yr_{cc'r} \leq 1 \quad \forall c,c' \in C, r \in R$$

However, because the objective function in one embodiment is to maximize a summation of the $yr_{cc'r}$ variables with non-negative coefficients, the second set of constraints are implied by the first set of constraints at optimality, and therefore are not required. Similarly, the following set of constraints should be imposed on the new $ye_{cc'e}$ variables:

$$ze_{ce} \geq ye_{cc'e}, ze_{c'e} \geq ye_{cc'e}, \quad \forall c,c' \in C, e \in E$$

It should be noted that the new $yr_{cc'r}$ and $ye_{cc'e}$ variables only need to be continuous in the interval [0, 1] instead of being binary. For example, based on the above discussion, constraint (21) and the maximization nature of the objective function together helps to ensure that $yr_{cc'r}$ behaves exactly as the product of $zr_{cr}$ and $zr_{c'r}$. Since $zr_{c'r}$ and $zr_{cr}$ are both binary, $yr_{cc'r}$ never really takes a fractional value between 0 and 1.

The above substitution of variables results in a linear optimization problem with some integer variables and some continuous variables, thus a mixed integer programming problem. It is referred to as RAP-LINI, to be distinguished from the original nonlinear formulation RAP0. One possible issue with this formulation is that the number of variables is significantly higher than that of RAP0 with the introduction of $|C| \times |C| \times (|R|+|E|)$ continuous variables. There are a number of ways to improve the efficiency in solving the problem.

First, the number of $yr_{cc'r}$ and $ye_{cc'e}$ variables can be reduced in the following way: $yr_{cc'r}$ is defined if and only if $FR_{cr}=1$, $FR_{c'r}=1$, and $T_{cc'}>0$; and $ye_{cc'e}$ is defined if and only if $FE_{ce}=1$, $FE_{c'e}=1$, and $T_{cc'}>0$. In all the other cases, the $yr_{cc'r}$ and $ye_{cc'e}$ variables are not needed in the formulation. This implies that, in the worst case where all the rack and edge switches are feasible for all the components, the number of extra variables in RAP-LINI is $|L| \times (|R|+|E|)$, i.e., the number of communication links in the application graph times the total number of LAN switches.

A second way of improving efficiency is to realize that, since the number of $zr_{cr}$ and $ze_{ce}$ variables ($|C| \times (|R|+|E|)$) are typically significantly less than the number of $x_{cs}$ variables $|C|\times|S|$, the efficiency of the branch and bound algorithm in the MIP solver can be increased by assigning higher priority to branching on variables $ze_{ce}$ and $zr_{cr}$.

The RAP-LINI formulation described above uses a linearization technique that results in a MIP formulation with $|L|\times(|R|+|E|)$ additional continuous variables over RAP0. A relatively more sophisticated linearization scheme, which leads to another MIP formulation with possibly fewer extra variables, is described below.

When looking at the LAN traffic flowing through each rack switch, it may be appreciated that, for all $c \in C$ and $r \in R$, $zr_{cr}\cdot TO_c$ represents the amount of traffic originating from component c under switch r, and $$\sum_{c' \in N_c} zr_{c'r} T_{cc'}$$

represents the amount of traffic originating from component c and received under switch r. Now a new variable is defined, $$tro_{cr} = zr_{cr}TO_c - zr_{cr}\sum_{c' \in N_c} zr_{c'r}T_{cc'},$$

which captures the amount of traffic that originated from component c under switch r and leaves switch r.

By definition of $zr_{cr}$, $$tro_{cr} = \begin{cases} zr_{cr}TO_c - \sum_{c' \in N_c} zr_{c'r}T_{cc'}, & \text{if } zr_{cr} = 1; \\ 0, & \text{if } zr_{cr} = 0. \end{cases}$$

Therefore, $tro_{cr}$ can be equivalently defined as, $$tro_{cr} = \max\left\{zr_{cr}TO_c - \sum_{c' \in N_c} zr_{c'r}T_{cc'}, 0\right\}$$

Since $tro_{cr}$ represents the amount of outgoing traffic from component c that passes through rack switch r, and the objective function tends to reduce the amount of traffic that passes through switches, the above definition can be enforced using the following two linear constraints:

$$tro_{cr} \geq zr_{cr}TO_c - \sum_{c' \in N_c} zr_{c'r}T_{cc'} \text{ and } tro_{cr} \geq 0 \quad (22)$$

That is, these constraints will be binding at optimality.

Using the new variables $tro_{cr}$, the rack switch outgoing bandwidth constraint (8) in RAP0 can be rewritten as $$\sum_{c \in C} tro_{cr} \leq BRO_r, \forall r \in R \quad (23)$$

Similarly, the amount of LAN traffic originating from component c that leaves edge switch e can be represented using the following new variable:

$$teo_{ce} = ze_{ce}TO_c - ze_{ce}\sum_{c' \in N_c} ze_{c'e}T_{cc'}.$$

This would be enforced by the following constraints:

$$teo_{ce} \geq ze_{ce}TO_c - \sum_{c' \in N_c} ze_{c'e}T_{cc'} \text{ and } teo_{ce} \geq 0 \quad (24)$$

Then, constraint (10) of RAP0 can be rewritten as $$\sum_{c \in C} teo_{ce} \leq BEO_e, \forall e \in E \quad (25)$$

Analogous variables $tri_{cr}$ ($tei_{ce}$) representing the amount of incoming traffic to component c under rack switch r (edge switch e) from components outside the switch can be defined, with the following additional constraints:

$$tri_{cr} \geq zr_{cr}TI_c - \sum_{c' \in N_c} zr_{c'r}T_{c'c} \text{ and } tri_{cr} \geq 0 \quad (26)$$

$$tei_{ce} \geq ze_{ce}TI_c - \sum_{c' \in N_c} ze_{c'e}T_{c'c} \text{ and } tei_{c,e} \geq 0 \quad (27)$$

Then constraints (9) and (11) of RAP0 can be rewritten as $$\sum_{c \in C} tri_{cr} \leq BRI_r, \forall r \in R \quad (28)$$

$$\sum_{c \in C} tei_{ce} \leq BRI_e, \forall e \in E \quad (29)$$

By comparing the definition of the new variables with the objective function J2 in RAP0, it can be seen that:

$$J2 = \sum_{r \in R}\sum_{c \in C}(tro_{cr} + tri_{cr}) + \sum_{e \in E}\sum_{c \in C}(teo_{ce} + tei_{ce}) - \sum_{e \in E}\sum_{c \in C}ze_{ce}(TO_c + TI_c)$$

Since $$\sum_{e \in E}\sum_{c \in C}ze_{ce}(TO_c + TI_c) = \sum_{c \in C}(TO_c + TI_c)$$

is a constant, an equivalent objective function is the following:

$$\text{Min } J3 = \sum_{r \in R} \sum_{c \in C} (tro_{cr} + tri_{cr}) + \sum_{e \in E} \sum_{c \in C} (teo_{ce} + tei_{ce})$$

The interpretation of the objective function follows. To reduce the traffic-weighted average inter-server distance, it is generally equivalent to minimize the total amount of traffic flowing on all the Ethernet links. Because the total amount of traffic originating from and received by all the application components is a constant, the total amount of traffic flowing on all the server-to-switch links is a constant. Therefore, an equivalent objective function is to minimize the total amount of inter-switch traffic (represented by J3). The term "inter-switch traffic" refers to the traffic flowing on a link that connects two switches. These links are typically more expensive. Further, they are more likely to get saturated because they are often shared by multiple components, or even multiple applications. By minimizing the utilization of these shared links by a single application, the likelihood of creating bottlenecks in the LAN fabric is decreased.

This MIP formulation of the resource assignment problem is referred to as RAP-LINII. In this case, a total number of $2|C| \times (|R|+|E|)$ new continuous variables are introduced. This approach involves fewer extra variables than the RAP-LINI approach if $2|C|<|L|$, i.e., if each application component has, on average, more than 2 incident links. In case studies performed on the two mixed-integer processing formulations discussed above (RAP-LINI, RAP-LINII), the RAP-LINII formulation is more efficient.

Figure 6:
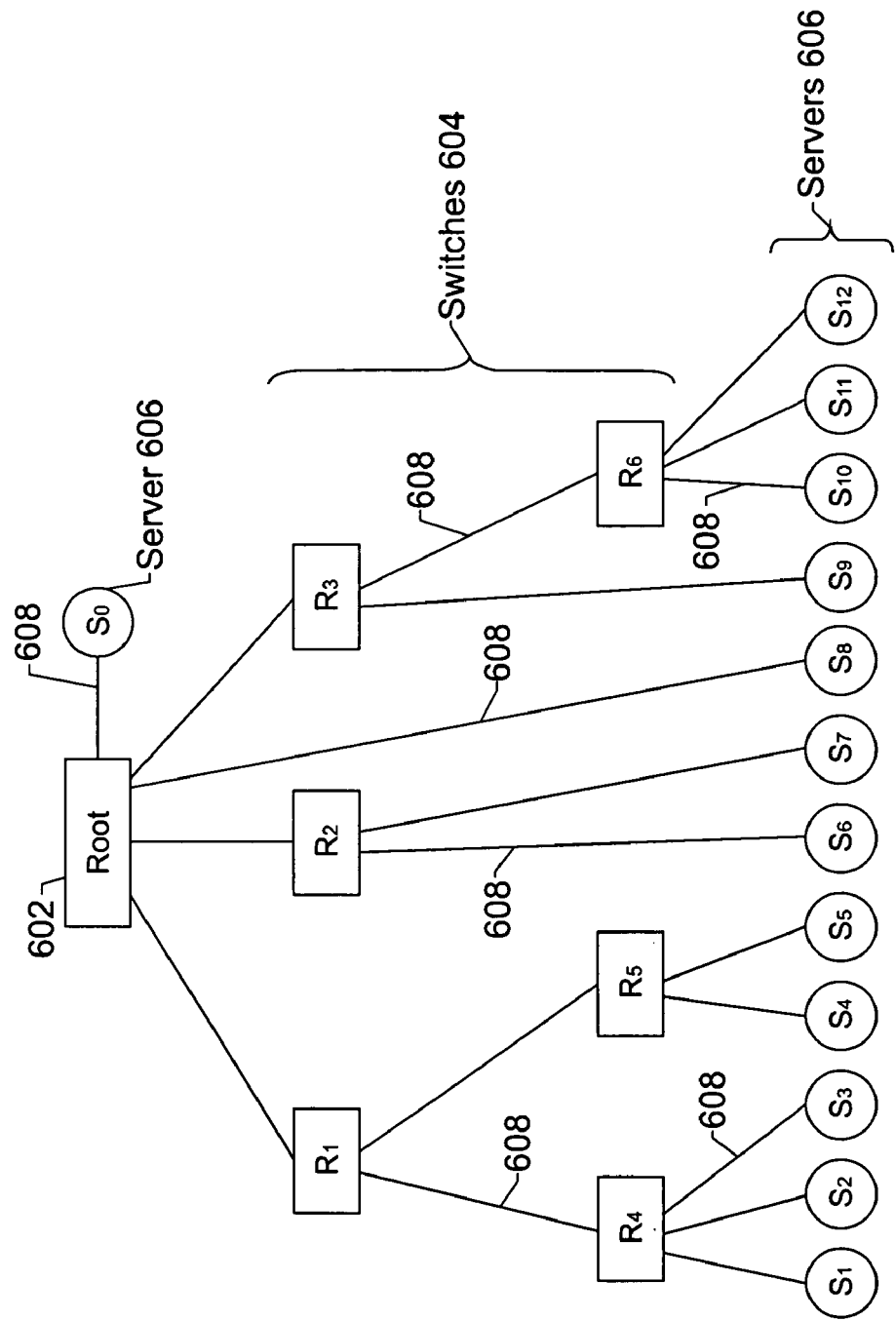
FIG. 6 is a diagram illustrating an embodiment of the tree topology of the Ethernet switching fabric.

FIG. 6 is a diagram illustrating an exemplary embodiment of the tree topology of the Ethernet switching fabric in accordance with the present techniques. Specifically, FIG. 6 illustrates a logical topology simplified from the original structure of a physical network. For example, in the physical network, multiple physical links can exist between two network nodes, and some or all of the switches can appear in redundant pairs for high availability purposes. As discussed regarding FIG. 5, the logical topology of FIG. 6 is a simplified form of a complex physical network and is referred to as a tree network 600.

The mathematical model for the tree topology 600 could contain sets and parameters shown below in Table 5.

TABLE 5

| Sets and indices | |
|---|---|
| s ∈ S: | Set of servers. |
| r ∈ R: | Set of switches (excluding the root switch). |
| n ∈ N: | Set of nodes in the tree network (excluding the root switch), where N = S ∪ R. |
| n ∈ N̂: | Set of nodes in the tree network (including the root switch), where N̂ = N ∪ {Root}. |
| e ∈ E: | Set of edges in the LAN fabric topology. Each edge e = (m, n) is an ordered pair of two nodes m and n in N̂. |
| SR$_r$ ⊂ S: | Set of servers connected (directly or indirectly) to switch r. |
| | Parameters: |
| B: | |E|-dim vector. B$_e$ or B$_{mn}$ is the link bandwidth of edge e = (m, n) ∈ E. |

The tree network 600 of FIG. 6 consists of a set of switches and a set of processing nodes (e.g., compute servers, load balancers, firewalls, etc.). The root of the tree is a root switch 602. All of the internal nodes 604 are switches (r∈R) and all of the leaf nodes of the tree are processing nodes (s∈S) 606. The processing nodes are referred to herein as "servers" 606. The capability of each server 606 are characterized by a set of attributes including non-capacitated attributes (e.g., processor type), linearly-additive capacitated attributes (e.g., disk space), and nonlinearly-additive capacitated attributes (e.g., amount of CPU resource). The server $s_0$ attached to the root switch 602 is an artificial node representing the outside world to the LAN, such as a higher level switch, a firewall, or a router. Each edge 608 in the tree (e∈E) is an ordered pair of two network nodes (switch or server) representing a directed network link going from one node to another. Each edge's bandwidth capacity is characterized by a bandwidth parameter.

The exemplary tree network 600 is more generalized than the LAN fabric topology 500 illustrated in FIG. 5. For example, the number of layers in the tree network 600 is not fixed as in the LAN fabric 500 and an arbitrary number of switch layers exist in the network 600. Additionally, although the leaf nodes in both LAN fabric 500 and tree network 600 are servers, network 600 is different because the servers can directly attach to the root switch 602. Further, the servers directly attached to the root switch in tree 600 can be treated the same as all other servers.

The tree topology of the LAN implies that every node (switch or server) in the network has one and only one parent node. As a result, each edge e=(m,n) in the network tree can be uniquely identified using only one node, which could be the child node between the two end nodes, plus the direction of the edge. For example, an edge e=(s,r) or e=(r,s) between server s and switch r can be associated with server s. $B_{sr}$ is referred to as the outgoing bandwidth of server s, and $B_{rs}$ is referred to as the incoming bandwidth of server s. Similarly, an edge e=(r1,r2) that connects switch r1 to switch r2 can be associated with switch r1 if r1 is the child node, or associated with switch r2 if r2 is the child node. Therefore, instead of a single vector B, the four vector parameters in Table 6 can be used to represent network link bandwidth.

TABLE 6

| | |
|---|---|
| BSI: | |S|-dim vector. BSI$_s$ is the incoming bandwidth of server s. |
| BSO: | |S|-dim vector. BSO$_s$ is the outgoing bandwidth of server s. |
| BRI: | |R|-dim vector. BRI$_r$ is the incoming bandwidth of switch r. |
| BRO: | |R|-dim vector. BRO$_r$ is the outgoing bandwidth of switch r. |

A server can be classified into several categories based on its attribute values. Server attributes can be capacitated or non-capacitated. Table 7 illustrates a classification of different attributes and a list of common examples.

TABLE 7

| Non-capacitated attributes: |
|---|
| Processor type, e.g. IA32 with 500 MHZ, PA-RISC 2.0, Ultra Sparc |
| OS type, e.g. Windows 2000, HP-UX, Solaris |
| Capacitated and linearly-additive attributes: |
| Disk space, often in MBs or GBs |
| Virtual memory, often in MBs or GBs |
| NIC bandwidth, often in Mbps or Gbps |
| Capacitated and nonlinearly-additive attributes: |
| Number of CPUs |

Based on the classification in Table 7, the present model for server attributes contains the following sets and parameters:

TABLE 8

| Sets and indices: | |
|---|---|
| $a \in A$: | Set of attributes describing a server's capability, where $A = A^{noncap} \cup A^{lin} \cup A^{nonlin}$. |
| $A^{noncap}$: | Subset of non-capacitated attributes. |
| $A^{lin}$: | Subset of capacitated and linearly-additive attributes. |
| $A^{nonlin}$: | Subset of capacitated and nonlinearly-additive attributes. |
| Parameters: | |
| $VAL_{as}$: | Set of possible values of non-capacitated attribute $a \in A^{noncap}$ for server s. |
| $CAP_{as}$: | Capacity value of capacitated attribute $a \in A^{lin} \cup A^{nonlin}$ for server s. |

The node $s_0$ attached to the root switch 602 in the LAN topology can be assigned to the artificial component $c_0$. Like the node $s_0$, the artificial component $c_0$, as discussed above and illustrated in FIG. 3, also represents the outside world (e.g., the Internet). Additionally, the two edges between the root switch and $s_0$ represent the physical link between the root switch and the outside world. Accordingly, the edges carry the total amount of traffic between the application and the outside world. If there are multiple outside worlds (e.g., the Internet, corporate intranet) that the application is communicating with, then multiple pairs of ($s_0$, $c_0$) are used. With this relationship, the same link capacity constraints are applied here as are applied to determine which server in the tree network 600 should be assigned to application components. However, this can also be taken care of in a pre-processing block. If constraints are not satisfied, meaning $s_0$ is infeasible for $c_0$ in terms of link bandwidth, the problem is infeasible immediately.

One embodiment of the present invention formulates the previously discussed RAP as a mathematical optimization problem with decision variables, a feasible region of allowed decision variables, an objective function, and a set of constraints. More specifically, the embodiment formulates the RAP as a Mixed Integer Programming (MIP) problem. In one embodiment, a commercially available mathematical programming tool (e.g., CPLEX MIP solver) can be used to find the optimal or near-optimal solution.

In the case of assigning a single server to multiple Type II components, as discussed above, the capacitated attributes of the server are capable of being shared by all the components that are co-located on the server. Thus, the aggregate capacity requirements from all of the components generally should not exceed the total capacity of each attribute. The specific types of constraints embodiments of the present invention use to enforce this relationship generally depend on whether the attribute is linearly-additive or nonlinearly-additive. For a linearly-additive attribute, the aggregate capacity required by multiple components equals the sum of the capacities required by each individual component. For a nonlinearly-additive attribute, in addition to the sum, there exists a fixed overhead associated with hosting more than one component on a server, as well as an incremental overhead associated with each additional component.

An embodiment of the present invention solves a resource assignment problem in a network fabric with a generalized tree topology as opposed to tree networks 500 with special structures. In accordance with FIG. 6, an embodiment could be applied to tree networks 600 having any number of layers of switches 602, where the topology can be asymmetric and the servers 604 can be directly connected to any switch 602 on any layer. Additionally, an embodiment of the present invention could be applied to applications with smaller components that are capable of sharing a common server with other components. A server could be running multiple application components under the same operating system or partitioned into multiple virtual servers using virtual machine technologies. For example, embodiments of the present invention enable resource assignment techniques to be applied in server consolidation, driven by the desire of cost reduction in the IT infrastructure.

In embodiments of the present invention relating to FIG. 6, the optimization problem decides which server should be assigned to which application component. This is represented by the following matrix of binary variables. For all $c \in C$ and $s \in S$, $$x_{cs} = \begin{cases} 1 & \text{server } s \text{ assigned to component } c; \\ 0 & \text{otherwise.} \end{cases}$$

In addition, for all $c \in C$ and $r \in R$, $$z_{cr} = \begin{cases} 1 & \text{switch } r \text{ assigned to component } c; \\ 0 & \text{otherwise.} \end{cases}$$

Here, a switch is assigned to a component if and only if at least one server connected (directly or indirectly) under the switch is assigned to that component. In other words, $z_{cr}=1$ if and only if $x_{cs}=1$ for some $s \in SR_r$. Therefore, z, variables and $x_{cs}$ variables are related as follows:

$$\sum_{s \in SR_r} x_{cs} = z_{cr}, \forall c \in C, r \in R.$$

As described in relation to FIG. 5, and as could be applicable to FIG. 6, the search space can be limited for these binary variables by pre-computing their corresponding feasibility matrices. The feasibility matrix FS between application components and servers is defined as:

$$FS_{cs} = \begin{cases} 1 & \text{server } s \text{ can be assigned to component } c; \\ 0 & \text{otherwise.} \end{cases}$$

for all $s \in S$ and $c \in C$, $FS_{cs}=1$ if and only if the following is true:
a) $VREQ_{ac} \cap VAL_{as} \neq \Phi$ for all $a \in A^{noncap}$;
b) $CREQ_{ac} \leq CAP_{as}$ for all $a \in A^{lin} \cup A^{nonlin}$;
c) $TI_c \leq BSI_s$ and $TO_c \leq BSO_s$.

In addition, FR is the feasibility matrix for the switches. $FR_{cr}=1$ if and only if $FS_{cs}=1$ for some $s \in SR_r$.

Moreover, based on the server feasibility matrix FS, the set of feasible components is defined as $C_s=\{c \in C: FS_{cs}=1\}$, for each server s. Again, a component can be either Type I (does not allow sharing) or Type II (allows sharing). Therefore, the set $C_s$ is capable of being partitioned accordingly into two subsets. The first subset, $C_s^1$, is the set of Type I components that server s is feasible for, i.e., $C_s^1=C_s \cap C^1$. Thus, server s can be assigned to at most one component in $C_s^1$. The second subset, $C_s^m$, is the set of Type II components that server s is feasible for, i.e., $C_s^m = C_s \cap C^m$. This means, server s could be assigned to multiple components in $C_s^m$ at the same time. Hence, $C_s = C_s^1 \cup C_s^m$, and $C_s^1 \cap C_s^m = \phi$.

Additionally, a new variable can be defined. For all $c \in C$ and $r \in R$:

$$tro_{cr} = z_{cr} TO_c - z_{cr} \sum_{c' \in N_c} z_{c'r} T_{cc'}$$

The intuition is that $z_{cr} TO_c$ is the total amount of traffic originating from component c under switch r, and that $$z_{cr} \sum_{c' \in N_c} z_{c'r} T_{cc'}$$

is the amount of traffic originating from component c under switch r and received by servers under switch r (i.e., the intra-switch traffic at switch r that originated from component c.) Therefore, $tro_r$, represents the amount of traffic that originated from component c under switch r and passes through switch r.

Similarly, this definition is provided $$tri_{cr} = z_{cr} TI_c - z_{cr} \sum_{c' \in N_c} z_{c'r} T_{c'c}$$

to represent the amount of incoming traffic to component c under switch r from components outside the switch.

The traffic coming into and going out the server is calculated in a similar fashion. Thus, the decision variables $tso_{cs}$ and $tsi_{cs}$ are defined as the amount of traffic originating from component c that goes out of, or comes into, server s, respectively, as a result of the assignment. These variables are defined by the following equations. For all $c \in C$ and $s \in S$:

$$tso_{cs} = x_{cs} TO_c - x_{cs} \sum_{c' \in C_s^m} x_{c's} T_{cc'}$$

$$tsi_{cs} = x_{cs} TI_c - x_{cs} \sum_{c' \in C_s^m} x_{c's} T_{c'c}$$

It should be noted that, if server s is assigned to only one component c (i.e., $x_{cs}=1$), then $tso_{cs}=TO_c$, and $tsi_{cs}=TI_c$. However, if server s is assigned to component c and any other component c' in $C_s^m$ at the same time, communication between these two components is considered internal to the server, and thus does not consume bandwidth capacity on the server's external link.

In one embodiment, the objective function is to minimize the traffic-weighted average inter-server distance, where distance is measured in terms of network hop count. Let $D_{ss'}$ be the distance between two servers s and s', and $TA_{ss'}$ be the amount of LAN traffic from server s to server s' as a result of server assignment. Then the objective function is:

$$\text{Min } J1 = \sum_{s,s' \in S} D_{ss'} TA_{ss'}$$

Since $$TA_{ss'} = \sum_{c \in C} \sum_{c' \in N_c} x_{cs} T_{cc'} x_{c's'},$$

then:

$$J1 = \sum_{c \in C} \sum_{c' \in N_c} \sum_{s,s' \in S} x_{cs} D_{ss'} T_{cc'} x_{c's'}$$

The value of $D_{ss'}$ depends on the relative location of servers s and s'. For example, $D_{ss'}=2$ if both servers are directly connected to the same switch. It may be noted that, when $s=s'$, $D_{ss}=0$, meaning that if two communicating components are assigned to the same server s, then the network hop count between these two components becomes zero. At the same time, $$TA_{ss} = \sum_{c \in C} \sum_{c' \in N_c} x_{cs} T_{cc'} x_{c's},$$

which represents the total amount of communication inside server s. The goal of the objective function is to keep servers that communicate heavily closer to each other in the network. For example, if $T_{cc'}$ is large, it is preferable to assign both components c and c' to the same server, if possible. If not, assigning them to two servers under the same switch is preferred.

Because $D_{ss'}$ is not a constant, calculating J1 is not straightforward for given values of $x_{cs}$. Here a different representation of the same objective function that is easier to compute is presented. Minimizing J1 is equivalent to minimizing the total amount of application traffic on all the network links. The amount of traffic originating from component c and passing through edge e, and the summation of such traffic from all the components on all the edges should be taken into consideration. Since each edge can be associated with either a server or a switch, the objective function can be rewritten as:

$$\text{Min } J1 = \sum_{c \in C} \left( \sum_{s \in S} (tso_{cs} + tsi_{cs}) + \sum_{r \in R} (tro_{cr} + tri_{cr}) \right)$$

This is a linear function of all the continuous link traffic variables and leads to another interpretation of the objective function. Because each network link can be shared by multiple application components, multiple servers, sometimes even multiple applications, by minimizing the utilization of these shared links by a single application, the likelihood of creating bottlenecks in the LAN fabric is reduced.

The total amount of traffic passing through switch r and going to its parent switch is $$\sum_{c \in C} tro_{cr},$$

which is bounded by the outgoing link bandwidth at the switch. Hence:

$$\sum_{c \in C} tro_{cr} \le BRO_r, \forall r \in R$$

Similarly, the total amount of traffic received by switch r from its parent switch is bounded by the incoming link bandwidth at the switch. That is:

$$\sum_{c \in C} tri_{cr} \le BRI_r, \forall r \in R$$

The bandwidth constraints for the links that connect a server to a switch can be derived in a similar fashion, i.e., the total amount of traffic going out of and coming into each server should be bounded by the corresponding link capacity. Therefore:

$$\sum_{c \in C} tso_{cs} \le BSO_s, \forall s \in S$$

$$\sum_{c \in C} tsi_{cs} \le BSI_s, \forall s \in S$$

In accordance with the above, $$tro_{cr} = z_{cr} TO_c - z_{cr} \sum_{c' \in N_c} z_{c'r} T_{cc'},$$

which shows that the variables tro can be expressed as a non-linear function of the z variables. This nonlinear relationship can be linearized in the following way. By definition of $z_{cr}$:

$$tro_{cr} = \begin{cases} z_{cr} TO_c - \sum_{c' \in N_c} z_{c'r} T_{cc'}, & \text{if } z_{cr} = 1; \\ 0, & \text{if } z_{cr} = 0. \end{cases}$$

Therefore, $tro_{cr}$ can be equivalently defined as, $$tro_{cr} = \max\left\{ z_{cr} TO_c - \sum_{c' \in N_c} z_{c'r} T_{cc'}, 0 \right\}$$

Because the objective function drives $tro_{cr}$ towards smaller values, the above relationship can be enforced using the following two linear constraints:

$$tro_{cr} \ge z_{cr} \cdot TO_c - \sum_{c' \in N_c} z_{c'r} T_{cc'} \text{ and } tro_{cr} \ge 0$$

That is, these constraints will be binding at optimality.

Similarly, the relationship between $tri_{cr}$ and $z_{cr}$ can be translated into the following two linear constraints:

$$tri_{cr} \ge z_{cr} \cdot TI_c - \sum_{c' \in N_c} z_{c'r} T_{c'c} \text{ and } tri_{cr} \ge 0.$$

Also, $$tso_{cs} = x_{cs} TO_c - x_{cs} \sum_{c' \in C_s^m} x_{c's} T_{cc'}$$

is defined as the amount of outgoing traffic at server s that originated from component c. By definition of $x_{cs}$:

$$tso_{cs} = \begin{cases} x_{cs} TO_c - \sum_{c' \in C_s^m} x_{c's} T_{cc'}, & \text{if } x_{cs} = 1; \\ 0, & \text{if } x_{cs} = 0. \end{cases}$$

Therefore, $tso_{cs}$ can equivalently be defined as:

$$tso_{cs} = \max\left\{ x_{cs} TO_c - \sum_{c' \in C_s^m} x_{c's} T_{cc'}, 0 \right\}$$

Since the objective function drives $tso_{cs}$ towards smaller values, the above relationship can be enforced using the following two linear constraints:

$$tso_{cs} \ge x_{cs} TO_c - \sum_{c' \in C_s^m} x_{c's} T_{cc'} \text{ and } tso_{cs} \ge 0.$$

That is, these constraints will be binding at optimality. Similarly, $tsi_{cs}$ can be linearized as follows:

$$tsi_{cs} \ge x_{cs} TI_c - \sum_{c' \in C_s^m} x_{c's} T_{c'c} \text{ and } tsi_{cs} \ge 0.$$

If a single server is assigned to host multiple application components at the same time, either under the same operating system, or possibly under different operating systems using virtual machines, it is necessary to insure that, first, the server is feasible for all hosted components; and second, the aggregate capacity required by all these components does not exceed the capacities of the server's capacitated attributes.

For any component $c \in C$, the pre-computed server feasibility matrix FS decides whether a particular server can be assigned to this component. However, for components of Type II, additional attribute capacity constraints can be needed to decide whether a server can be shared by multiple such components. For linearly-additive attributes and nonlinearly-additive attributes, the constraints come in different forms.

For linearly-additive capacitated attributes, the following capacity constraint can be considered.

$$\sum_{c \in C_s^m} CREQ_{ac} x_{cs} \leq CAP_{as}, \forall a \in A^{lin}, s \in S \quad (30)$$

At the same time, the following constraint can be required:

$$x_{cs} + \sum_{c' \in C_s^l} x_{c's} \leq 1, \forall c \in C_s^m, s \in S \quad (31)$$

This constraint ensures that the same server is not assigned to both a component of Type I and a component of Type II.

For nonlinearly-additive capacitated attributes, both a fixed overhead, $\Theta_{as}$, and an incremental overhead, $\theta_{as}$, on the capacity of each shared attribute $a \in A^{nonlin}$ of server s can be considered. The fixed overhead can be for having more than one component on a given server. The incremental overhead can be for each additional component. Overhead values can be relative or absolute. For absolute overhead values the following constraint applies:

$$\sum_{c \in C_s^m} CREQ_{ac} x_{cs} + \Theta_{as} \delta_s + \theta_{as} \left( \sum_{c \in C_s^m} x_{cs} - 1 \right) \leq CAP_{as}, \forall a \in A^{nonlin}, s \in S \quad (32)$$

In case the overhead values, $\Phi_{as}$ and $\phi_{as}$, are given in relative terms, the corresponding overhead values can be set in absolute terms by computing $\Theta_{as} = \Phi_{as} CAP_{as}$ and $\theta_{as} = \phi_{as} CAP_{as}$, and using constraint (32).

In the above constraint, a new binary variable can be used that captures the creation of a fixed overhead whenever a plurality of components share the same server.

$$\delta_s = \begin{cases} 1 & \text{more than one component assigned to server } s; \\ 0 & \text{otherwise.} \end{cases}$$

The following logical constraint ensures that $$\delta_s = 1 \text{ if } \sum_{c \in C_s^m} x_{cs} - 1 > 0.$$

$$\sum_{c \in C_s^m} x_{cs} - 1 \leq |C_s^m| \delta_s$$

Another logical constraint ensures that $$\delta_s = 0 \text{ if } \sum_{c \in C_s^m} x_{cs} \leq 1.$$

$$\sum_{c \in C_s^m} x_{cs} \geq 1.1 \delta_s$$

The variables $\delta_s$ can be fairly numerous. They can be removed from the formulation as follows. The capacity constraint with the absolute overhead values can be expressed as follows:

$$\sum_{c \in C_s^m} (CREQ_{ac} + \theta_{as}) x_{cs} + \Theta_{as} - \theta_{as} \leq CAP_{as}, \forall a \in A^{nonlin}, s \in S \quad (33)$$

The variables $\delta_s$ are set to 1 in the above constraint, and thus do not appear in the inequality. Constraint (33) and constraint (32) can be equivalent as long as some corner cases are addressed. The following three situations should be considered:
1. When $$\sum_{c \in C_s^m} x_{cs} > 1, \delta_s = 1,$$

constraint (32) and (33) are exactly the same.
2. When $$\sum_{c \in C_s^m} x_{cs} < 1, \delta_s = 0,$$

the left hand side of both constraints (32) and (33) become negative and both constraints are satisfied automatically.
3. When $$\sum_{c \in C_s^m} x_{cs} = 1, \delta_s = 0,$$

constraint (32) becomes $$\sum_{c \in C_s^m} CREQ_{ac} x_{cs} \leq CAP_{as}, \forall a \in A^{nonlin}, s \in S, \quad (34)$$

and constraint (33) becomes $$\sum_{c \in C_s^m} CREQ_{ac} x_{cs} + \Theta_{as} \leq CAP_{as}, \forall a \in A^{nonlin}, s \in S. \quad (35)$$

Constraint (35) could be tighter than constraint (34). If for some server s and some component $c \in C_s^m$, there exists a nonlinearly-additive attribute $a \in A^{nonlin}$, such that $CREQ_{ac} + \Theta_{as} > CAP_{as}$, then constraint (35) is violated, yet constraint (34) is satisfied automatically by the definition of $C_s^m$. However, these special cases can be eliminated by pre-processing. The following rule can be defined:

For all $s \in S$ and $C \in C_s$, if $\exists a \in A^{nonlin}$ s.t. $CREQ_{ac} + \Theta_{as} > CAP_{as}$, then $c \in C_s^1$.

If the above condition holds, then at least one attribute capacity constraint will be violated if component c shares server s with another component. Hence, component c should really be Type I from the perspective of sharing server s. Therefore, component subsets $C_s^1$ and $C_s^m$ are computed during pre-processing as follows.

$$C_s^1 = \{c \in C^1 : FS_{cs} = 1\} \cup \{c \in C : CREQ_{ac} + \Theta_{as} > CAP_{as}, \exists a \in A^{nonlin}, FS_{cs} = 1\}, C_s^m = \{c \in C^m : FS_{cs} = 1, CREQ_{ac} + \Theta_{as} \leq CAP_{as}, \forall a \in A^{nonlin}\}.$$

With this classification of feasible components, for all servers $s \in S$ and all components $c \in C_s^m$, constraints (34) and (35) are both satisfied automatically for all $a \in A^{nonlin}$. Thus, it is demonstrated that constraints (32) and (33) are equivalent to each other for all three cases. Therefore, constraint (33) can be used as the capacity constraint for nonlinearly-additive attributes, and the use of binary variables $\delta_s$ is not necessary.

In summary, the reformulated optimization problem for RAP follows (the LAN part):

$$\text{Min} \sum_{c \in C} \left( \sum_{s \in S} (tso_{cs} + tsi_{cs}) + \sum_{r \in R} (tro_{cr} + tri_{cr}) \right) \sum_{s \in S} x_{cs} = 1, \forall c \in C$$

$$\sum_{c \in C} x_{cs} \leq 1, \forall s \in S$$

$$\sum_{s \in SR_r} x_{cs} = z_{cr}, \forall c \in C, r \in R$$

$$\sum_{c \in C} tso_{cs} \leq BSO_s, \forall s \in S$$

$$\sum_{c \in C} tsi_{cs} \leq BSI_s, \forall s \in S$$

$$\sum_{c \in C} tro_{cr} \leq BRO_r, \forall r \in R$$

$$\sum_{c \in C} tri_{cr} \leq BRI_r, \forall r \in R$$

$$x_{cs} TO_c - \sum_{c' \in N_c} x_{c's} T_{cc'} \leq tso_{cs}, \forall c \in C, s \in S$$

$$x_{cs} TI_c - \sum_{c' \in N_c} x_{c's} T_{c'c} \leq tsi_{cs}, \forall c \in C, s \in S$$

$$z_{cr} TO_c - \sum_{c' \in N_c} z_{c'r} T_{cc'} \leq tro_{cr}, \forall c \in C, r \in R$$

$$z_{cr} TI_c - \sum_{c' \in N_c} z_{c'r} T_{c'c} \leq tri_{cr}, \forall c \in C, r \in R$$

$$\sum_{c \in C_s^m} CREQ_{ac} * x_{cs} \leq CAP_{as}, \forall a \in A^{lin}, s \in S$$

$$\sum_{c \in C_s^m} (creq_{ac} + \theta_{as}) x_{cs} \leq CAP_{as} - (\Theta_{as} - \theta_{as}),$$

-continued $$\forall a \in A^{nonlin}, \forall a \in A^{nonlin}, s \in S$$

$$x_{xs} + \sum_{c' \in C_s^1} x_{c's} \leq 1, \forall c \in C_s^m, s \in S$$

$$x_{cs} \in \{0, FS_{cs}\}, z_{cr} \in \{0, FR_{cr}\}, tso_{cs} \geq 0, tsi_{cs} \geq 0, tro_{cr} \geq 0, tri_{cr} \geq 0$$

The above optimization problem is linear, with a combination of $|C| \times |N|$ binary variables and $2|C| \times |N|$ continuous variables. This is a mixed integer programming (MIP) formulation, as discussed previously, which can be solved using commercial solvers, such as CPLEX.

While the RAP, including the RAP-LINI and RAP-LINII formulations, can deal with the server, storage, and networking constraints imposed by the infrastructure during assignment (technical constraints), the RAP is also capable of considering preferences of operators, administrators, users, and other external actors, in addition to business rules. As used herein, the term "operator policy" refers to any such preference, rule, or policy that can be implemented that is not a technical constraint required by the infrastructure during resource assignment. For example, in one embodiment, it could be important to consider application priority when resources are scarce or component migration policies during application flexing. These operator policies or preferences, including business rules, are incorporated as logical constraints during resource assignment.

Figure 7:
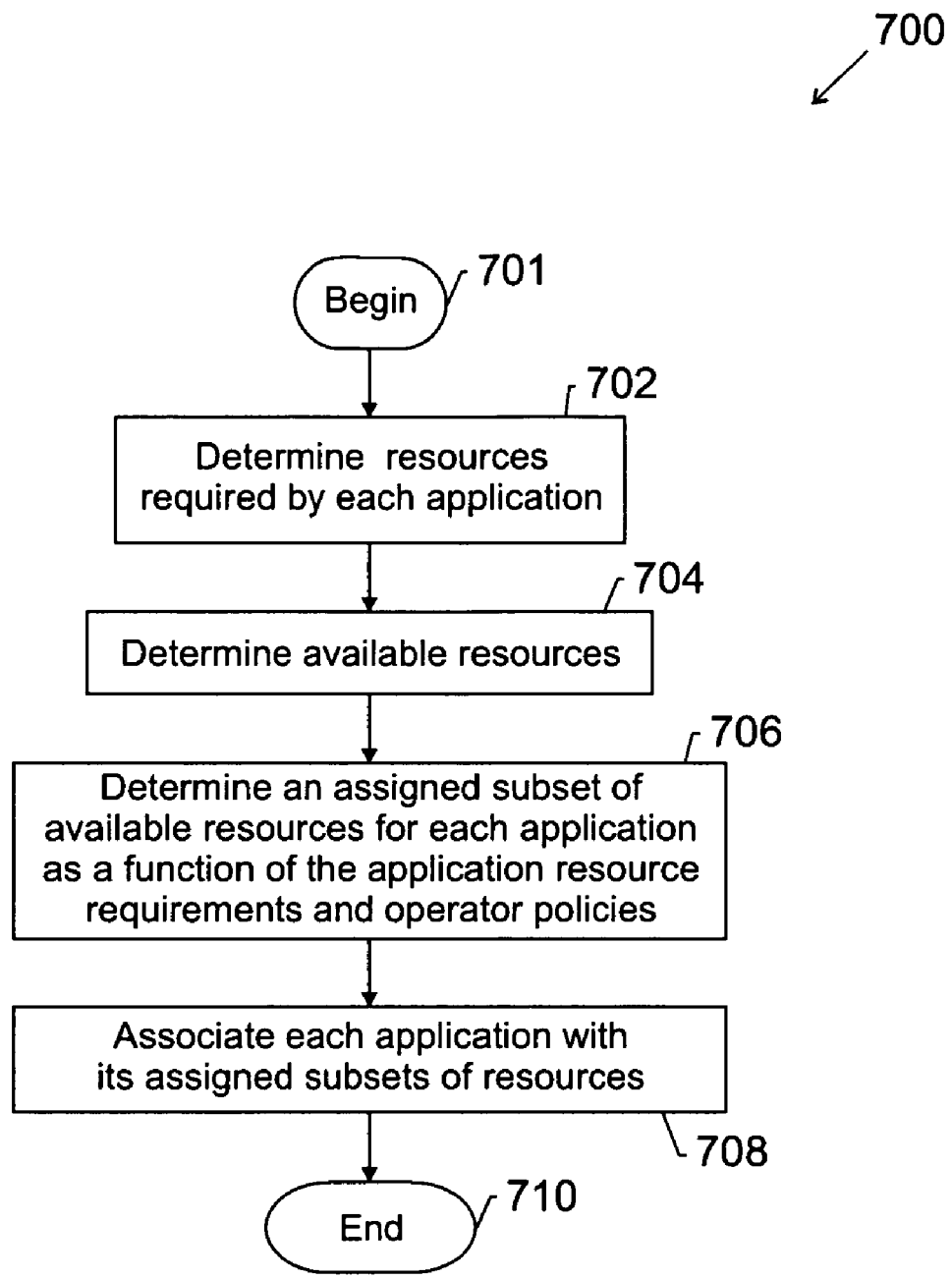
FIG. 7 is a flowchart illustrating exemplary steps in performing resource assignment in view of operator policies.

FIG. 7 is a flowchart 700 illustrating exemplary steps in performing resource assignment in view of operator policies in accordance with the present techniques. Proceeding from the beginning of the flowchart (block 701) corresponding to one embodiment, the application design block 702 is first performed, which generally involves determining a set of processing, communication, and storage resources required by each application. The system parameters are then determined (block 704); such parameters typically include available process resources, storage resources, and the capacities of network data links. These resources could be considered constant or variable depending on the application (e.g., application deployment time versus automatic fail-over). While flowchart 700 shows block 704 following block 702, it should be noted that these blocks could be reversed in an alternative embodiment.

Once the application and network resources have been defined, the resource assignment problem can be solved (block 706). This typically involves determining an assigned subset of the available resources as a function of the application resource requirements and the available resources, and could also be a function of operator, administrator, or user preferences and business rules, which are represented in the RAP as logical constraints. The solution can involve minimizing communication delays between resources, satisfying server attribute and bandwidth capacity requirements of the application, and satisfying network bandwidth limits. In addition, as a result of the operator policies considered, the solution can also involve assigning resources based on preferences, such as user priority or the need for high availability. The solution (block 706) can utilize any of the described formulations for linearizing the Ethernet fabric constraints (e.g., RAP-LINI, RAP-LINII). Preferably, the formulation is chosen based on computing efficiency. Finally, the solution obtained is used to associate (block 708) the applications with the assigned subset of resources and the flowchart ends (block 710).

As discussed above, operator preferences or rules are represented in the RAP as logical constraints. More specifically, for resource assignment, each preference or policy is implemented as either a hard constraint or a soft constraint. Though discussed in greater detail below, it may be emphasized that the assignment system is allowed to violate soft constraints to varying degrees in order to ensure a technically feasible solution. In contrast, some hard constraints such as technological constraints (e.g., capacity limits) cannot be violated during resource assignment because their violation implies technological infeasibility.

Accordingly, operator policies and business rules are expressed as logical statements that are actually preferences. In such instances, it is generally desirable for these preferences to be true, so long as other hard constraints are not violated. The set of operator policies for an assignment itself defines a feasible region of decision variables. Replacing the feasible region of the original problem with the intersection of that region and the feasible region defined by operator policies provides the region of all feasible assignments that meet technical requirements and operator policies at the same time. Because a wide variety of operator policies can be expressed by the decision region formed by linear inequalities, they are capable of being incorporated into the resource assignment problem during mathematical optimization.

The concept of hard and soft constraints developed in the context of mathematical programming provides a valuable tool to handle operator policies in resource assignment. Hard constraints are stated as inequalities in an optimization problem. Any assignment that would violate any of such constraints is identified as infeasible and not a viable solution. In general, constraints imposed by the technology are considered to be hard constraints that cannot be violated (i.e., their violation implies technical infeasibility of the solution). Alternatively, constraints imposed by operator policies are capable of implementation as either hard constraints that cannot be violated or soft constraints, which can be violated to varying degrees if a solution is not otherwise possible. This is accomplished by introducing a variable v that measures the degree of violation of a constraint.

For example, a policy constraint can be given by:

$$f(x) \leq b$$

where x is the vector of decision variables, the function f(x) encapsulates the logic of the constraint and the scalar b represents a desirable threshold. In the above formulation, the constraint is hard. In order to satisfy the constraint, any valid assignment x must result in a function value f(x) which is less than or equal to b. By introducing a violation variable v in the form:

$$f(x) \leq b+v,$$

it can be observed that for any choice of x, the variable v will have to take a value $v \geq f(x) - b$ which is at least as big as the amount by which the original constraint would be violated. Thus, the magnitude of v is used to denote the amount of the violation. Nonetheless, regardless of the particular choice of x, the soft constraint of the latter formulation can be satisfied.

However, merely providing a variable v to ensure satisfaction of the constraint would render the new constraint meaningless. In order to compel the optimization algorithm to find an assignment x that would violate the constraint only as much as necessary to find an otherwise feasible solution, a penalty is introduced into the objective function that is proportionate to the violation itself by including a term M·v in the function. The introduced term M·v is subtracted from the objective function if the goal is to maximize the function. Alternatively, if the goal is to minimize the objective function, this penalty term is added. The value for M is set to define the magnitude of the penalty to be associated with any violation of a constraint as described above. The higher the value for M is set, the greater the penalty will be for a violation of the constraint. Thus, if M is a sufficiently large number, the search for the optimal solution will attempt to minimize the violation of the constraint and only consider a violation if there is no feasible solution that satisfies all constraints.

Numerous operator policies related to resource assignment in a utility computing environment can be handled by the optimization approach described herein. For instance, policies that can be implemented in accordance with embodiments of the present invention include, but are not limited to: priority policies on classes of applications; migration policies during application flexing; policies for avoiding hot spots inside the resource pool, such as load balancing, or assigning/migrating servers based on local thermal conditions; policies for high availability, such as dictating redundant designs, or maintaining buffer capacities in shared resources; and policies for improving resource utilization, such as allowing overbooking of resources. Also, a plurality of such operator policies or business rules could be combined in a template to address specific scenarios. In such a case, an operator or administrator could select the desired template to incorporate the desired policies or rules into resource assignment. By way of example, exemplary implementations of specific policies are discussed below.

In a resource constrained environment of one embodiment, it is useful to consider different classes of applications, corresponding to different levels of service, which will be reflected in terms of priorities during resource assignment. If resources are insufficient to satisfy all applications, low priority applications are more likely to be rejected when making assignment decisions. For instance, in such an implementation, the following priority policy could be considered: Only assign an application with lower priority to the computing utility if its assignment does not preclude the assignment of any application of higher priority. While a policy such as this has a very complex logical structure, it can be efficiently implemented by using soft constraints.

First, a binary decision variable is defined such that $x_{cs} = 1$ if component c is assigned to server s, otherwise $x_{cs} = 0$. Next, C(App) represents the set of all components of application App, with |C(App)| denoting the number of components of the respective application. Then the hard constraints $$\sum_{s \in S} x_{cs} \leq 1 \text{ for all } c \in C(App) \text{ and } 1 - \sum_{c \in C(App)} \sum_{s \in S} x_{cs} / |C(App)| \leq 0$$

ensure that every component is assigned to at most one server and all components of this application are assigned. Introducing the binary violation variable $V_{APP}$ and softening the second constraint to $$1 - \sum_{c \in C(App)} \sum_{s \in S} x_{cs} / |C(App)| \leq v_{App}$$

allow application App to not have all its components assigned when $v_{App} = 1$. If the term $M_{App} v_{App}$ is subtracted from the objective function (assuming the goal is to maximize the objective function), not completely assigning an application comes at a price of $M_{App}$. By choosing the magnitude $M_{App}$ according to the application's priority in such a way that higher priority applications have penalties that are larger than all potential penalties of lower priority applications combined, the optimal solution of the modified assignment problem will conform to the priority policy outlined above. More specifically, in the optimal solution, $V_{APP}=0$ if there exists at least one solution that satisfies all the hard constraints of the optimization problem and that may or may not completely assign some of the lower priority applications, and $V_{APP}=1$ if there are no feasible solutions to the problem unless application App is not completely assigned.

Alternatively, other application prioritization policies can be incorporated in accordance with other embodiments of the present invention. For instance, a utility computing environment could have some upgraded resources with attributes higher than the minimum requirements. In such a case, even though it is possible for lower priority applications to use these upgraded resources, it would be desirable to reserve such resources for higher priority applications. Accordingly, it can be considered as an administrator policy or business rule that component c of a lower priority application should not be assigned to upgraded server s, or feasibility matrix $FS_{cs}=0$. Another matrix can be defined that expresses the technical possibility that component c could be assigned to server s, or technically feasible matrix $TECH_{cs}=1$. Further, in place of the constraint $x_{cs} \in \{0, FS_{cs}\}$ in the RAP model, the following new constraints, in which a variable $v_{cs}$ that reflects violation of this policy is defined, could be employed: $x_{cs} \leq v_{cs}$ and $v_{cs} \in \{0, TECH_{cs}\}$. Finally, the term $M \cdot v_{cs}$ is included in the objective function. As discussed above, the sign of the term is positive or negative depending on whether the goal is to maximize or minimize the objective function.

By further way of example, the incorporation of exemplary migration policies during application flexing into the original RAP MIP formulation is also provided. The term "application flexing" refers to the process of adding additional resources to, or removing resources from, running applications. Policies dictating whether or not a component of an application can be migrated to accommodate changing resource requirements of the applications in the environment are of particular interest. First, $C^{placed}$ is defined as the set of components of running applications that have been placed on servers of the computing utility. It is also taken that every component is currently placed on one server. This assignment can be expressed as a component-server pair. Next, ASSIGN is the set of existing assignments, i.e., ASSIGN={$(c,s)$:component c is assigned to server s}.

The subset of migratable components in $C^{placed}$ is denoted as $C^{mig} \subseteq C^{placed}$, and the subset of components that cannot be migrated is denoted as $C^{nomig}=C^{placed}-C^{mig}$. Then, the following migration policy is considered: If an application component is not migratable, it should remain on the server it was placed on; if a component is migratable, migration should be avoided as much as possible unless no feasible assignments can be found with new application requirements otherwise.

Prohibiting migration of the components in $C^{nomig}$ can be accomplished by introducing the following additional constraints: For each assignment $(c,s) \in $ ASSIGN, $x_{cs}=1$ $c \in E$ $C^{nomig}$ The above policy also dictates that even though the components in $C^{mig}$ can be migrated, it might not be desirable to do so. By introducing a penalty $\pi^{mig}$ for changing the assignment of an existing component, it is possible to deter migration (unless migration is necessary for finding a feasible assignment). In our formulation, it is possible to subtract $$\sum_{\substack{(c,s) \in ASSIGN \\ c \in CMIG}} \pi^{mig}(1-x_{cs})$$

from the objective function. Consequently, the penalty is incurred whenever a component is moved away from its current server, i.e. when $x_{cs}=0$.

As a final example, in another embodiment, an operator policy is also incorporated in the RAP to avoid the creation of resource bottlenecks. Such bottlenecks are avoided by load balancing. For instance, it is possible to balance the workload within a utility computing environment by balancing the amount of communicative traffic passing through the switches of the environment. A decision variable, T, is defined to measure the maximum traffic that passes through any switch of the utility computing environment. Therefore, T is defined as:

$$T \geq \sum_{c \in C} tro_{cr} \text{ and } T \geq \sum_{c \in C} tri_{cr} \text{ } r \in R$$

Thus, in this case, the load balancing objective function is to minimize the maximum traffic passing through a switch, or Min T. This allows the relationship between minimizing communication delay and load balancing to be analyzed.

Resource bottlenecks can also be avoided by using constraints to limit the number of components that can be assigned to servers directly connected to a switch. In this approach, $NR_r$ is the maximum number of components that can be assigned to a rack switch r. Accordingly, the following constraint is imposed:

$$\sum_{c \in C} z r_{cr} \leq NR_r \text{ } r \in R$$

Further, in addition to avoiding bottlenecks, the parameters $NR_r$ can also be used to generate capacity buffers or ensure levels of utilization.

It should be noted that the examples provided above are included for exemplary purposes. As would be appreciated by one skilled in the art, many other policies, including other policies mentioned herein, can be dealt with in a similar fashion. Further, while policies and preferences are discussed above in a server resources context, policies for storage resources (e.g., centralized storage devices 514) can be easily incorporated in a similar manner.

Individual modules and components relating to embodiments of the present invention and illustrated in FIGS. 1-7 could comprise hardware, software or some combination thereof. Further, while illustrated embodiments separately delineate specific modules, in other embodiments, individual modules can be split into multiple modules or combined into a single module. For example, in some embodiments of the present invention, illustrated modules do not operate in the illustrated order. Further, individual modules can be broken into multiple modules or multiple modules can be combined into a single module.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A method for assigning resources to an application component, comprising:
   identifying an application component;
   determining available resources of a networked computing system for running the application component;
   determining required resources for the application component;
   assigning hard and soft constraints to the available resources and the required resources;
   assigning hard and soft constraints to an operator policy representing preferences for assigning resources to the application component;
   assigning a subset of available resources to the application component taking into account an objective function with the hard and soft constraints of the required resources of the application component, the hard and soft constraints of the available resources, and the hard and soft constraints of the operator policy;
   associating the application component with the subset of available resources; and
   solving a mixed-integer programming problem including analyzing the objective function, wherein the objective function includes a penalty term corresponding to a magnitude of a violation of a soft constraint.

2. The method of claim 1, further comprising identifying a plurality of application components.

3. The method of claim 2, wherein the plurality of application components are associated with a plurality of applications.

4. The method of claim 1, wherein the operator policy is a priority policy on classes of applications.

5. The method of claim 1, wherein the operator policy is a migration policy for application flexing.

6. The method of claim 1, wherein the operator policy is a policy for reducing an occurrence of an undesirable condition in a resource pool.

7. The method of claim 1, wherein the operator policy is a policy for improving availability of resources.

8. The method of claim 1, wherein the operator policy is a policy for improving resource utilization.

9. The method of claim 1, wherein assigning a subset of available resources for the application component comprises assigning a subset of available resources for the application component taking into account a plurality of operator policies.

10. The method of claim 1, further comprising reducing communication delays between resources of the subset of available resources in conformance with a network constraint that relates to a capacity of a network component.

11. A system for assigning resources to an application component, comprising:
    a processor;
    a memory;
    an identification module having computer executable instructions stored thereon which are executed by the processor to identify an application component;
    a determining module having computer executable instructions stored thereon which are executed by the processor to determine available resources of a networked computing system for running the application component;
    a requirement module having computer executable instructions stored thereon which are executed by the processor to determine required resources for the application component;
    an assignment module having computer executable instructions stored thereon which are executed by the processor to:
      assign hard and soft constraints to the available resources and the required resources;
      assign hard and soft constraints to an operator policy representing preferences for assigning resources to the application component;
      assign a subset of available resources for the application component taking into account an objective function with the hard and soft constraints of the required resources of the application component, the hard and soft constraints of the available resources, and the hard and soft constraints of the operator policy; and
      solve a mixed-integer programming problem to find an assignment location for the application component, the mixed-integer programming problem comprising an objective function including a penalty term proportionate to an amount of violation of a soft constraint; and
    an association module having computer executable instructions stored thereon which are executed by the processor to associate the application component with the subset of available resources.

12. The system of claim 11, wherein the identification module includes instructions stored thereon which are executed by the processor for identifying a plurality of application components.

13. The system of claim 12, wherein the plurality of application components are associated with a plurality of applications.

14. The system of claim 11, wherein the assignment module includes instructions stored thereon which are executed by the processor to assign a subset of available resources for the application component taking into account a plurality of operator policies.

15. The system of claim 11, wherein the assignment module includes instructions stored thereon which are executed by the processor to solve the mixed-integer programming problem to find assignment locations for the application component.

16. A computer-usable non-transitory medium with instructions for assigning resources to an application component, comprising:
    an identification module stored on the non-transitory medium, the identification module adapted to identify an application component;
    a determining module stored on the non-transitory medium, the determining module adapted to determine available resources of a networked computing system for running the application component;
    a requirement module stored on the non-transitory medium, the requirement module adapted to determine required resources for the application component;
    an assignment module stored on the non-transitory medium, the assignment module adapted to:
      assign hard and soft constraints to the available resources and the required resources;

assign hard and soft constraints to an operator policy representing preferences for assigning resources to the application component; and assign a subset of available resources for the application component taking into account an objective function with the hard and soft constraints of the required resources of the application component, the hard and soft constraints of the available resources, and the hard and soft constraints of the operator policy; and solve a mixed-integer programming problem to find an assignment location for the application component, the mixed-integer programming problem comprising an objective function including a penalty term proportionate to an amount of violation of a soft constraint; and an association module stored on the tangible non-transitory medium, the association module adapted to associate the application component with the subset of available resources.

17. The computer-usable non-transitory medium of claim 16, wherein the assignment module is adapted to reduce communication delays between resources of the subset of available resources in conformance with a plurality of operator policies.

18. The computer-usable non-transitory medium of claim 16, wherein the assignment module is adapted to reduce communication delays between resources of the subset of available resources in conformance with an infrastructure constraint.

19. The computer-usable non-transitory medium of claim 16, further comprising a MIP solver adapted to solve the mixed-integer programming problem to find an assignment location for the application component.

20. A system for assigning resources to an application component, comprising:

means for identifying an application component;

means for determining available resources of a networked computing system for running the application component;

means for determining required resources for the application component;

means for:

assigning hard and soft constraints to the available resources and the required resources;

assigning hard and soft constraints to an operator policy representing preferences for assigning resources to the application component;

assigning a subset of available resources to the application component taking into account an objective function with the hard and soft constraints of the required resources of the application component, the hard and soft constraints of the available resources, and the hard and soft constraints of the operator policy; and solving a mixed-integer programming problem to find an assignment location for the application component, the mixed-integer programming problem comprising an objective function including a penalty term proportionate to an amount of violation of a soft constraint; and means for associating the application component with the subset of available resources.

21. A method for assigning resources to an application component, comprising:

receiving a request from a client for computing resources to run an application component;

determining required resources for processing the application component;

determining available resources for processing the application component;

assigning hard and soft constraints to the available resources and the required resources;

assigning hard and soft constraints to an operator policy representing preferences for assigning resources to the application component;

responding to the request from the client taking into account an objective function with the hard and soft constraints of the required resources, the hard and soft constraints of the available resources, and the hard and soft constraints of the operator policy; and solving a mixed-integer programming problem including analyzing the objective function, wherein the objective function includes a penalty term corresponding to a magnitude of a violation of a soft constraint.

22. The method of claim 21, wherein responding to the request from the client comprises associating a subset of the available resources with the application component.

23. A method for assigning resources to an application component, comprising:

identifying an application component;

determining available resources of a networked computing system for running the application component, the available resources comprising processing, communication, and storage resources;

determining required resources for the application component;

assigning hard and soft constraints to the available resources and the required resources;

assigning hard and soft constraints to an operator policy representing preferences for assigning resources to the application component;

solving a mixed-integer programming problem to assign a subset of available resources to the application component taking into account an objective function with the hard and soft constraints of the required resources, the hard and soft constraints of the available resources, and the hard and soft constraints of the operator policy, wherein solving a mixed-integer programming problem comprises analyzing the objective function, wherein the objective function includes a penalty term corresponding to a magnitude of a violation of a soft constraint; and associating the application component with the subset of available resources.

\* \* \* \* \*

UNITED STATES PATENT AND TRADEMARK OFFICE
CERTIFICATE OF CORRECTION

| | | |
|---|---|---|
| PATENT NO. | : 7,861,247 B1 | Page 1 of 1 |
| APPLICATION NO. | : 11/048530 | |
| DATED | : December 28, 2010 | |
| INVENTOR(S) | : Santos et al. | |

It is certified that error appears in the above-identified patent and that said Letters Patent is hereby corrected as shown below:

In column 37, line 16, in Claim 16, after "the" delete "tangible".

Signed and Sealed this
Twenty-sixth Day of April, 2011

David J. Kappos
*Director of the United States Patent and Trademark Office*